US009444598B2

(12) United States Patent
Addepalli et al.

(10) Patent No.: US 9,444,598 B2
(45) Date of Patent: Sep. 13, 2016

(54) APPLICATION-AWARE DYNAMIC BIT-LEVEL ERROR PROTECTION FOR MODULATION-BASED COMMUNICATION

(71) Applicant: Cisco Technology, Inc., San Jose, CA (US)

(72) Inventors: Sateesh K. Addepalli, San Jose, CA (US); Kevin C. Lee, Milpitas, CA (US); Raghuram S. Sudhaakar, Mountain View, CA (US); Jean-Philippe Vasseur, Saint Martin d'Uriage (FR); Flavio Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 14/295,445

(22) Filed: Jun. 4, 2014

(65) Prior Publication Data
US 2014/0269592 A1 Sep. 18, 2014

Related U.S. Application Data

(62) Division of application No. 13/402,150, filed on Feb. 22, 2012, now Pat. No. 8,761,285.

(51) Int. Cl.
*H04L 5/00* (2006.01)
*H04L 27/34* (2006.01)
*H04L 1/00* (2006.01)

(52) U.S. Cl.
CPC .............. *H04L 5/005* (2013.01); *H04L 1/007* (2013.01); *H04L 1/0075* (2013.01); *H04L 5/0055* (2013.01); *H04L 27/345* (2013.01); *H04L 27/3472* (2013.01)

(58) Field of Classification Search
CPC combination set(s) only.
See application file for complete search history.

(56) References Cited

U.S. PATENT DOCUMENTS 6,222,822 B1 4/2001 Gerardin et al.
6,687,247 B1 2/2004 Wilford et al.
(Continued)

FOREIGN PATENT DOCUMENTS

EP 0576764 A1 1/1994
WO WO-2007133937 A2 11/2007

OTHER PUBLICATIONS

Sen et al, Design and Implementation of an "Approximate" Communication System for Wireless Media Applications, ACM, 12 pages, 2010.*

*Primary Examiner* — Frank Duong
(74) *Attorney, Agent, or Firm* — Parker Ibrahim & Berg LLC; James M. Behmke; Stephen D. LeBarron

(57) ABSTRACT

In one embodiment, a device (e.g., a transmitter) determines a level of error protection of each bit position within symbols of a particular constellation map used for modulation-based communication, and also determines priority levels of application data bits to be placed into a communication frame. Application data bits may then be placed into symbols of the communication frame, where higher priority application data bits are placed into bit positions with greater or equal levels of protection than bit positions into which lower priority application data bits are placed. The communication frame may then be transmitted to one or more receivers with an indication of how to decode the placement of the application data bits within the symbols. In another embodiment, the particular constellation map may be dynamically selected from a plurality of available constellation maps, such as based on communication channel conditions and/or applications generating the data.

21 Claims, 24 Drawing Sheets

(56) References Cited

U.S. PATENT DOCUMENTS

| | | |
|---|---|---|
| 7,305,519 B1 | 12/2007 | Nagaraj |
| 7,475,299 B1 | 1/2009 | Brenes et al. |
| 2007/0088910 A1 | 4/2007 | Parthasarathy et al. |
| 2008/0219334 A1 | 9/2008 | Brainos et al. |
| 2009/0006927 A1 | 1/2009 | Sayadi et al. |
| 2009/0086699 A1* | 4/2009 | Niu .................... H03M 13/1102 370/342 |
| 2009/0271570 A1 | 10/2009 | Burns et al. |
| 2011/0176590 A1* | 7/2011 | Banerjee ................ H04L 1/007 375/224 |
| 2011/0280125 A1 | 11/2011 | Jayakumar |
| 2013/0188748 A1 | 7/2013 | Kim |

\* cited by examiner

US 9,444,598 B2

APPLICATION-AWARE DYNAMIC BIT-LEVEL ERROR PROTECTION FOR MODULATION-BASED COMMUNICATION

RELATED APPLICATION

This application is a divisional application of U.S. patent application Ser. No. 13/402,150, filed on Feb. 22, 2012, by Addepalli, et al., the contents of which are incorporated by reference herein.

TECHNICAL FIELD

The present disclosure relates generally to computer networks, and, more particularly, to modulation-based communication.

BACKGROUND

Shared-media communication environments, such as wireless computer networks, allow for many devices to communicate simultaneously with one another. Often, such communication environments are subjected to both internal and external forms of interference, and devices may not always have a reliable communication channel to other devices. As such, portions of transmitted messages (or all of the messages) may be erroneously received by a device, such as where a transmitted value (e.g., a "1") is received as a different value due to such interference (e.g., a "0" or an unknown value). For example, increased internal congestion may cause packet collisions, while other factors such as signal attenuation, path loss, or fading can lead to unpredictable losses in the power of the received signal.

In many communication environments, a plurality of applications may attempt to communicate data between communication devices simultaneously. In particular, according to various shared-media communication standards, such as IEEE Std. 802.11, data bits from one or more applications may be placed within communication frames (e.g., a same shared frame) at the physical (PHY) layer, and transmitted between the devices. The receiving device (PHY layer) would then decode the communication frames, and correspondingly reconstructs the original application data for the one or more applications.

Because of the potentially lossy nature of the shared-media network, however, the reconstructed application data may be incorrect, and may need to be retransmitted to correct the inconsistencies. For tolerant applications, such as low speed and/or low priority data transfer, this may not pose a significant issue. However, for less tolerant applications, such as high speed and/or high priority control messages, such information loss can be particularly problematic. Though there are many schemes that protect message transmissions, such as Automatic Repeat and reQuest (ARQ), Forward Error Correction (FEC), and others, generally such schemes require a certain number of parity bits to be sent along with actual data, which increases the overhead of the data communication, both in terms of the number of bits transmitted, and in terms of the processing power required to decode and reconstruct messages.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device (e.g., a transmitter) determines a level of error protection of each bit position within symbols of a particular constellation map used for modulation-based communication, and also determines priority levels of application data bits to be placed into a communication frame. Application data bits may then be placed into symbols of the communication frame, where higher priority application data bits are placed into bit positions with greater or equal levels of protection than bit positions into which lower priority application data bits are placed. The communication frame may then be transmitted to one or more receivers with an indication of how to decode the placement of the application data bits within the symbols.

According to one or more additional embodiments of the disclosure, the particular constellation map may be dynamically selected from a plurality of available constellation maps, such as based on communication channel conditions and/or applications generating the data, and the one or more receivers may be informed of which particular constellation map to use to decode symbols of a transmitted communication frame. For example, known pilot symbols may be transmitted to the receivers, where the receivers are configured to decode the pilot symbols using a plurality of constellation maps. Subsequently received in response may be a bit error rate (BER) value for each bit position of the pilot symbols for each of the plurality of constellation maps, where the BER values are used to determine the communication channel conditions, upon which the dynamic selection of the particular constellation map may be based.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Figure 1:
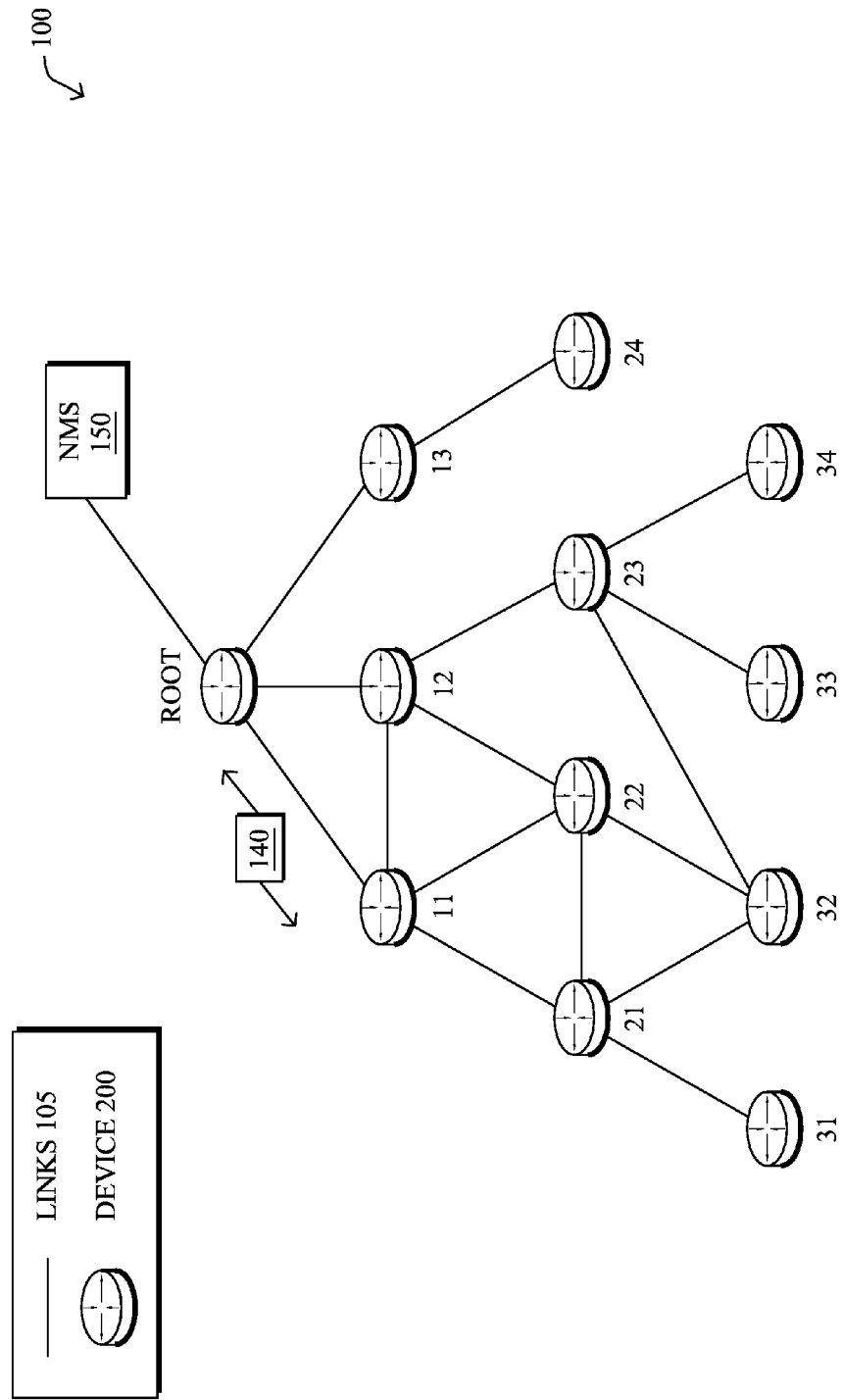
FIG. 1 illustrates an example communication network.

FIG. 1 is a schematic block diagram of an example computer network 100 illustratively comprising nodes/devices 200 (e.g., labeled as shown, "ROOT," "11," "12," . . . "34," and described in FIG. 2 below) interconnected by various methods of communication. For instance, the links 105 may generally be shared-media (e.g., wireless links), where certain nodes 200, such as, e.g., routers, sensors, computers, etc., may be in communication with other nodes 200, e.g., based on distance, signal strength, current operational status, location, etc. In addition, a network management device, such as a network management server (NMS) 150, may also be in communication with the network 100, such as via a WAN or backhaul link to the root node. Those skilled in the art will understand that any number of nodes, devices, links, etc. may be used in the computer network, and that the view shown herein is for simplicity. Also, those skilled in the art will further understand that while the network is shown in a certain orientation, particularly with a "root" border router node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.11, IEEE Std. 802.15.4, WiFi, Bluetooth®, etc.), or other protocols where appropriate. In this context, a protocol consists of a set of rules defining how the nodes interact with each other.

Figure 2:
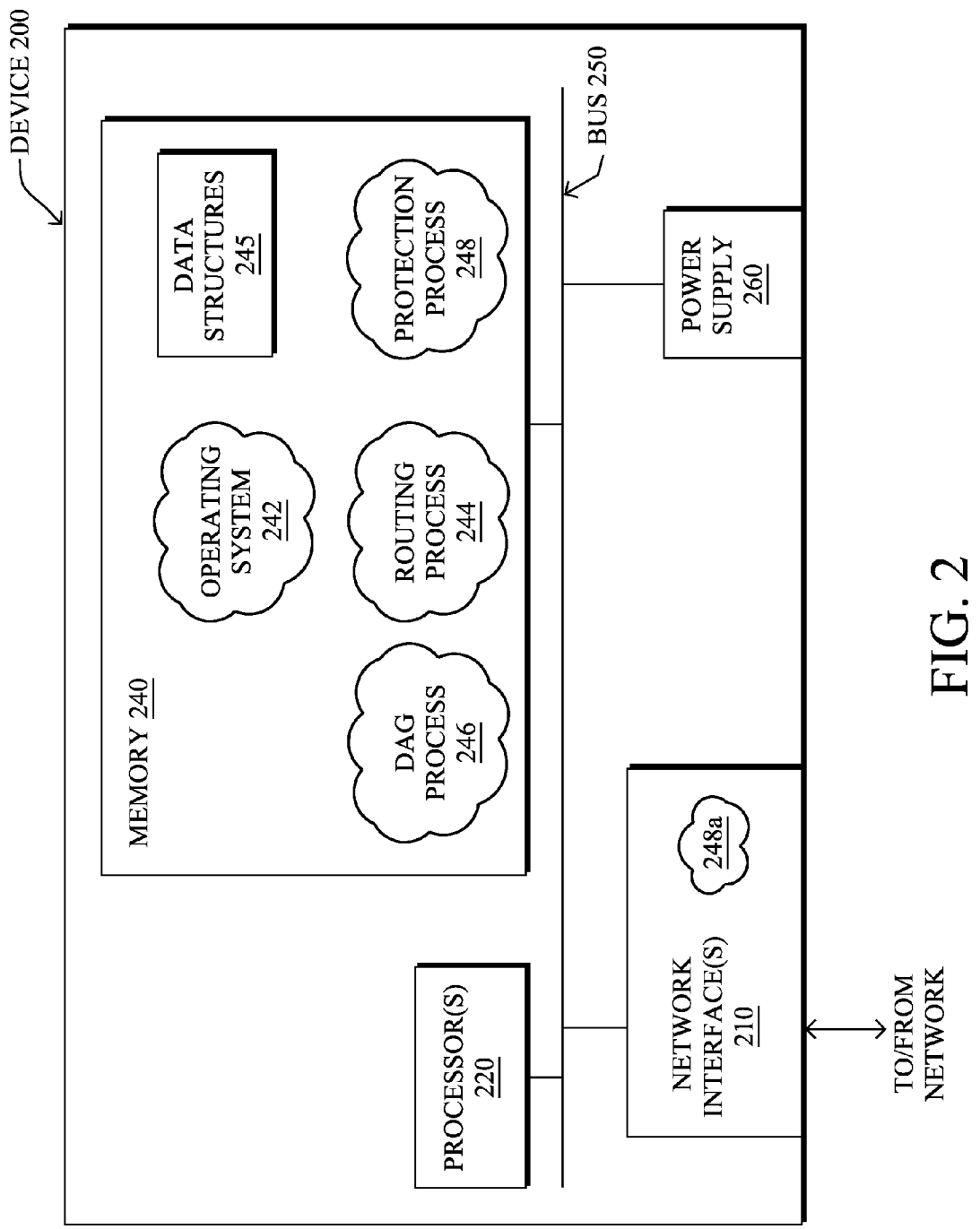
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that certain nodes may have two different types of network connections 210, e.g., wireless and wired/physical connections, and that the view herein is merely for illustration. For example, while some devices 200 may be entirely mobile (e.g., cars), other devices 200 may represent unmoving devices, and may allow for a wired connection, accordingly.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and a directed acyclic graph (DAG) process 246, as well as an illustrative "protection" process 248, as described herein. Note that while protection process 248 is shown in centralized memory 240, one or more embodiments specifically provide for the process, or particular portions of the "process," to be specifically operated within the network interfaces 210, e.g., as part of a MAC or PHY layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244, where used in a routing environment, contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a is single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of 0-15> by Thubert (Jul. 8, 2011 version) and "The Minimum Rank Objective Function with Hysteresis"<draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
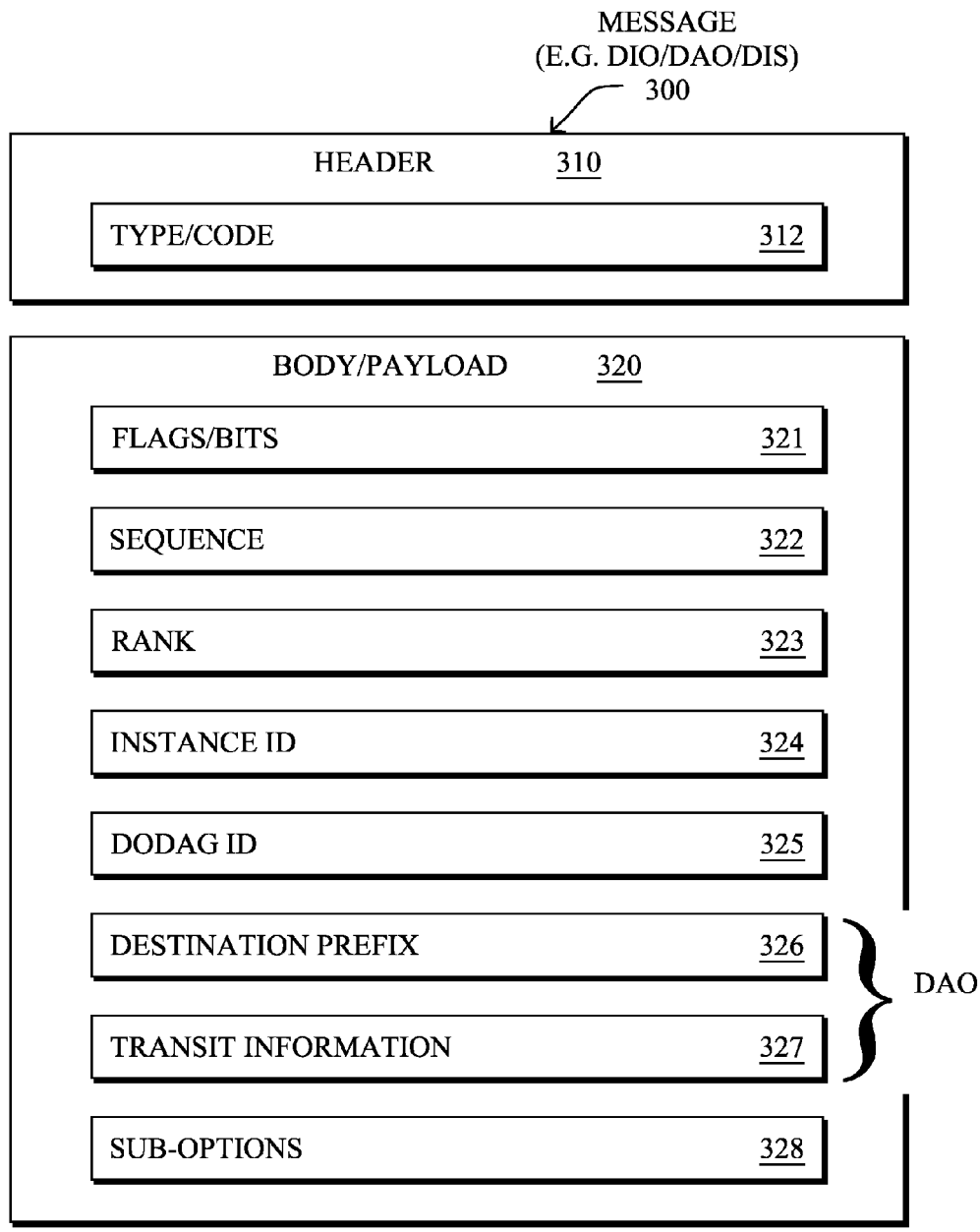
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
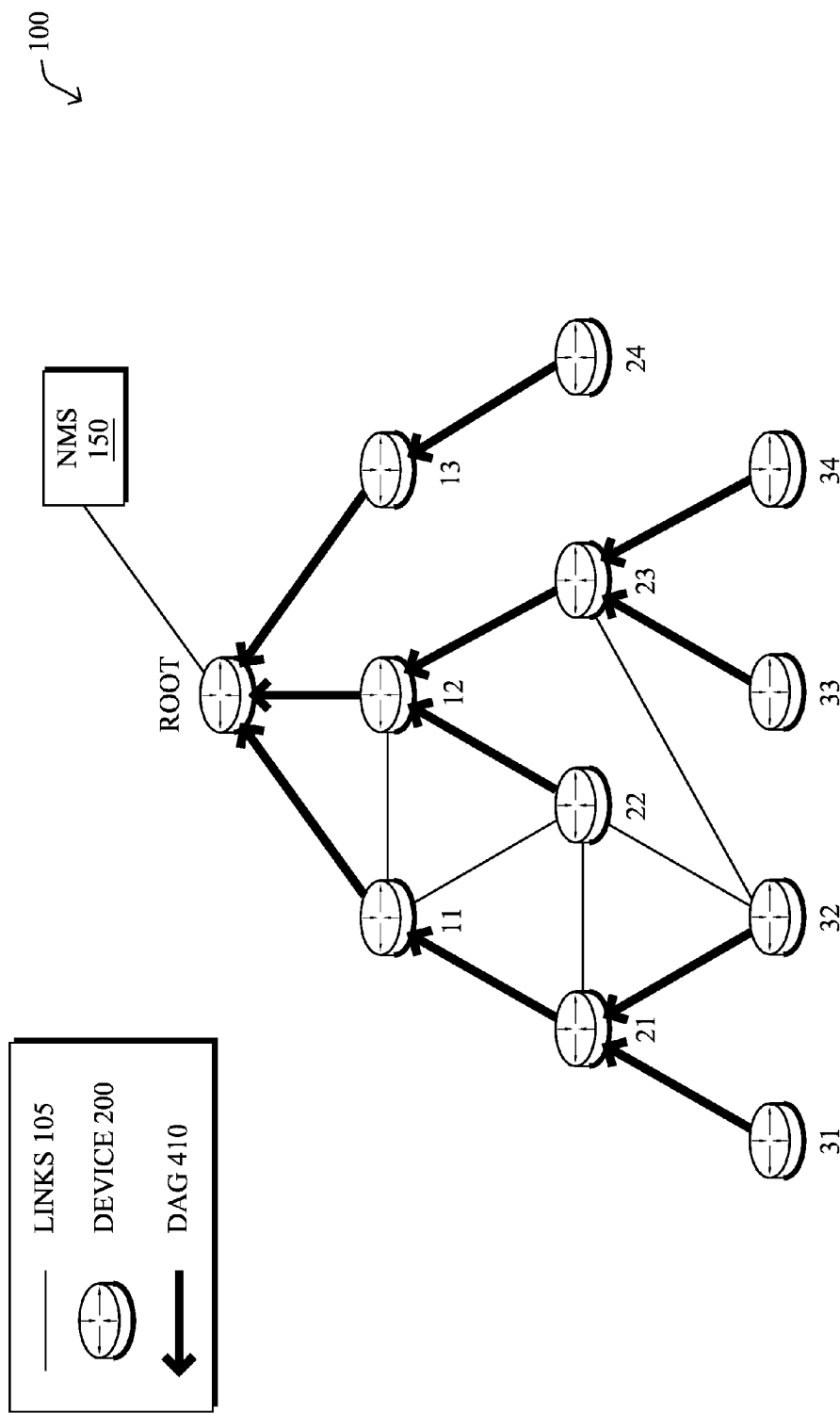
FIG. 4 illustrates an example directed acyclic graph (DAG) in the communication network in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as solid bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. In addition, the creation of the DAG may also provide for one or more alternate parents (next-hops). Note that while a DAG 410 is shown, other distance vector routing topologies may be created, and a DAG, particularly one created using RPL, is merely one example of a routing protocol topology that may be created and utilized according to the techniques described herein.

As noted above, shared-media communication environments, such as wireless computer networks, allow for many devices to communicate simultaneously with one another. Often, such communication environments are subjected to both internal and external forms of interference, and devices may not always have a reliable communication channel to other devices. As such, portions of transmitted messages (or all of the messages) may be erroneously received by a device, such as where a transmitted value (e.g., a "1") is received as a different value due to such interference (e.g., a "0" or an unknown value). For example, increased internal congestion may cause packet collisions, while other factors such as signal attenuation, path loss, or fading can lead to unpredictable losses in the power of the received signal.

In many communication environments, a plurality of applications may attempt to communicate data between communication devices simultaneously. In particular, according to various shared-media communication standards, such as IEEE Std. 802.11, data bits from one or more applications may be placed within communication frames (e.g., a same shared frame) at the physical (PHY) layer, and transmitted between the devices. The receiving device (PHY layer) would then decode the communication frames, and correspondingly reconstructs the original application data for the one or more applications.

Because of the potentially lossy nature of the shared-media network, however, the reconstructed application data may be incorrect, and may need to be retransmitted to correct the inconsistencies. For tolerant applications, such as low speed and/or low priority data transfer, this may not pose a significant issue. However, for less tolerant applications, such as high speed and/or high priority control messages, such information loss can be particularly problematic.

As also noted above, there are many schemes that protect message transmissions. However, they all have their disadvantages. In Automatic Repeat and reQuest (ARQ) schemes, for example, a certain number of parity bits are sent along with actual data. The receiver checks if the data is free of error against the parity bits. If there is an error, the receiver would request a retransmission. The disadvantage of ARQ is that it suffers from the inherent overhead of packing parity bits as part of the data communication. Throughput can rapidly degrade (due to retransmission) with increasing channel error rates, which may lead to unacceptable delays, particularly in fast-moving networks as described below. Forward Error Correction (FEC), similar to ARQ, sends parity bits to detect bit errors. However, the receiver performs error correction without requesting retransmissions. In order to attain high reliability, therefore, a long, powerful error-correcting code must be used, and a large collection of error patterns must be corrected. This makes decoding hard to implement and expensive. Other similar schemes in the art are similar to ARQ and/or FEC in some manner or another.

Since errors due to interference and/or noise are prevalent in many types of communication mediums, particularly being generally unavoidable in wireless communications, it is difficult to correct errors without out-of-band overhead such as retransmission or error correcting codes. Many communication environments, however, have a difficult balance between the inherent overhead of retransmission and/or error correcting codes, as well as the time-sensitivity of message transmission in general.

For instance, an illustrative type of wireless access called Wireless Access for Vehicular Environment (WAVE) has been established that is dedicated to vehicle-to-vehicle and vehicle-to-roadside communications. While the major objective has clearly been to improve the overall safety of vehicular traffic, promising traffic management solutions and on-board entertainment applications are also expected in this field. When equipped with WAVE communication devices, cars, and roadside units (RSUs) form a highly dynamic network called a Vehicular Ad Hoc Network (VANET), a special kind of MANET, where vehicles communicate with one another through wireless infrastructures to the Internet using a multihop-to-infrastructure routing protocol.

Figure 5:
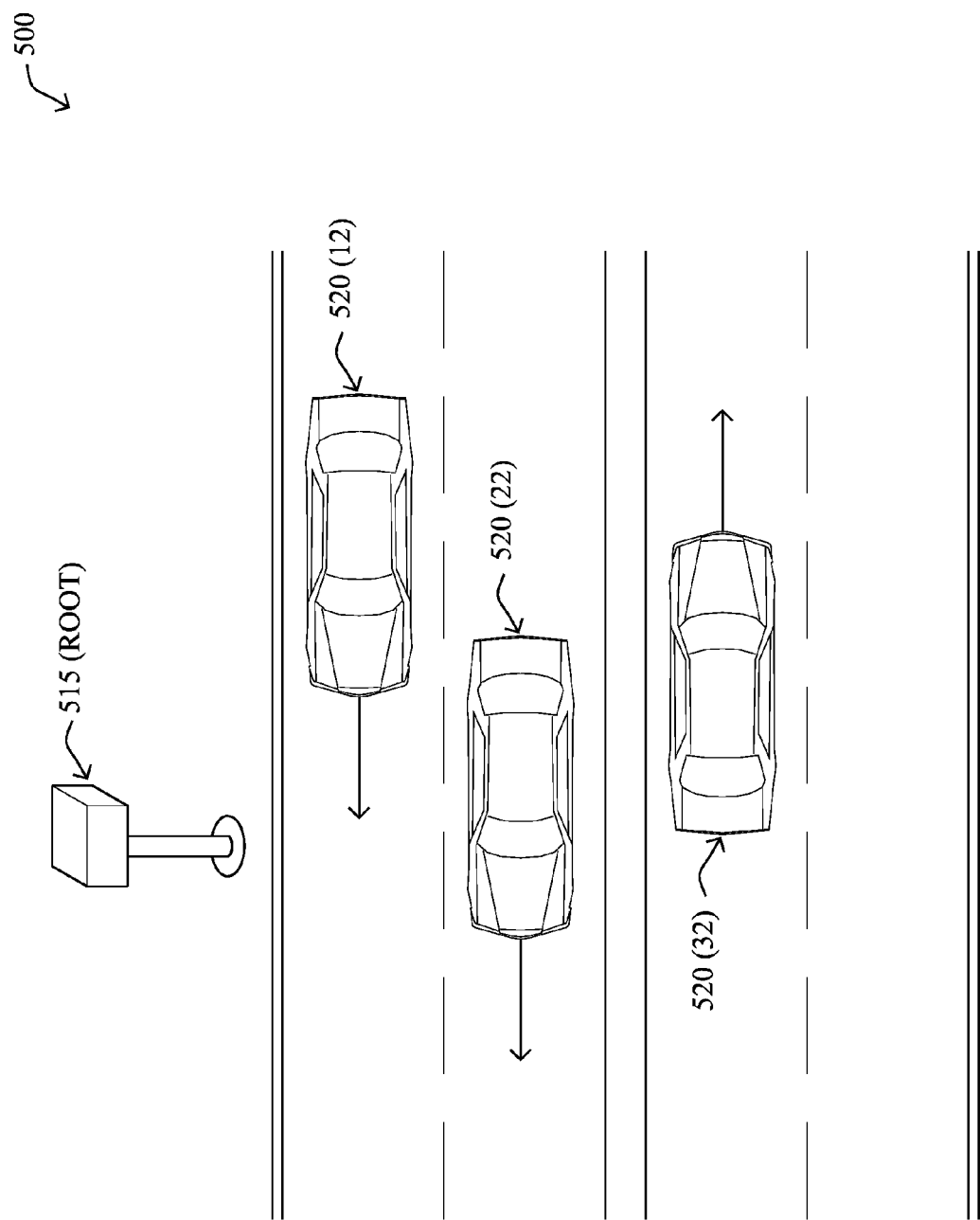
FIG. 5 illustrates an example of a specific example of a Vehicular Ad Hoc Network (VANET)

As an example, FIG. 5 illustrates a simplified VANET scenario 500 (with node references from the topology in FIG. 1), where a plurality of vehicles (cars, trucks, etc.) 520 may be in proximity to one another, while traveling at different speeds and directions. Also, one or more RSUs 515 may also be present along side the roadway, whether placed specifically for the purpose of vehicular communication (e.g., highways), or else another roadside unit configuration, such as a WiFi hotspot in the city.

Note that as free WiFi networks become predictably more accessible from vehicles, users will have a strong economic incentive to opportunistically offload data traffic from 3G and 4G links to free WiFi links. Since WiFi deployment is not prevalent, enabling vehicles to access roadside WiFi through other vehicles (multihop-to-infrastructure) allow more vehicles to take advantage of data offloading. From the perspective of the service providers, enabling vehicles to use a multihop-to-infrastructure architecture reduces the number of WiFi access points they need to deploy, thereby reducing the capital cost of WiFi infrastructure rollout. Moreover, as more vehicles are connected in the future, the network will inevitably support applications beyond safety to infotainment, video streaming, online gaming, etc. These applications tend to carry high volume data traffic, making ad hoc 802.11 type of wireless communication a suitable strategy. Thus, enabling multihop-to-infrastructure connectivity generally requires the support of a multihop-to-infrastructure vehicular routing protocol.

Intuitively, a tree topology is best suited for vehicles multi-hopping to road-side infrastructures. RPL, originally designed to meet specific requirements in LLNs such as sensor networks, can be adapted to meet VANET's requirements that consider channel congestion, channel characteristics, hidden terminals, vehicular traffic density, mobility, and many other factors. Although RPL is an ideal candidate for routing in a VANET, RPL has been inherently designed for fixed low-speed networks interconnecting highly constrained devices (in terms of CPU processing, memory and energy). In particular, RPL does not make use of keepalive mechanisms (such as OSPF) to maintain routing adjacencies, but rather relies on dataplane verification to detect that a next-hop is alive when sending data packets, e.g., thanks to IPv6 "NUD" or link-layer acknowledgments. Although RPL could be augmented with keepalive functionality, this does not solve the problem of maintaining connectivity in highly mobile networks such as VANET.

With regard to channel congestion, as many vehicles are equipped with 5.9 GHz dedicated short-range communication (DSRC) systems, vehicular networks will present several scenarios where a high number of nodes are concentrated in a small area. In these cases the number of packet collisions might be too high to support safety systems when using the carrier sense multiple access with collision avoidance (CSMA/CA) link-layer broadcast scheme of 802.11 without any additional control mechanism.

Furthermore, in an illustrative vehicular environment, the attenuation of a transmitted signal in a realistic scenario is not only caused by free-space loss. Phenomena such as path loss or fading can lead to unpredictable losses in the power of the received signal. Indeed, vehicular environments present unfavorable characteristics to develop wireless communications. For example, multiple reflecting objects could degrade the strength and quality of the receiving signal and, therefore, have a negative impact on messages reception rates.

Additionally, fading effects have to be taken into account due to the mobility of the surrounding objects and/or the sender and receiver themselves. Because of fast-fading phenomena, a transmitter can experience a different multipath environment each time it sends a packet and, therefore, each message can experience a different degree of attenuation.

Moreover, assuming a non-deterministic behavior of the radio channel, the "hidden terminal" problem also arises in a non-conventional manner. (Note, a hidden terminal example might be where node 11 communicates to node 12, at the same time node 13 is communicating to node 12, where node 11 and node 13 are unaware of each other's communication.) For instance, due to the variable attenuation suffered by transmitted messages in different directions, hidden terminals may be located closer to the original transmitter than expected. Hidden nodes challenge the CSMA/CA mechanism used by IEEE 802.11p with respect to the coordination among transmitting nodes in the network. Under such conditions, the amount of packet collisions is likely to quickly increase with the number of nodes and load to the channel.

Lastly, the high mobility of the nodes together with the large areas covered by vehicular networks make it infeasible to have a centralized management entity. Fair and efficient use of the resources is a hard task in a totally decentralized and self-organizing network. The Distributed Coordination Function (DCF) is a totally asynchronous approach and it is known for its inability to efficiently manage the media resources, especially in case of broadcast messages. Therefore, the inexistence of an entity able to synchronize and manage the transmission events of the different nodes in a network results in a less efficient usage of the channel (e.g., the use of random backoff timers is needed) and in an increased number of packet collisions.

In the illustrative architecture described above, road-side infrastructure such as WiFi access points (RSUs) serve as root nodes (e.g., LLN Border Routers or "LBRs") in the topology shown in FIG. 1. Vehicle On Board Units (OBUs) may thus try to connect to a root or multiple roots using RPL either directly or via other OBUs (which are being used as nodes/routers in the DAG). In this illustrative context of RPL, losing control messages, such as the DIO and/or DAO messages, may be extremely problematic, especially in a fast-moving VANET. Accordingly, protecting these control messages, over protecting general data being transmitted, is particularly important. Also, as stated, it is particularly important to do so without the overhead associated with large numbers of added parity bits or retransmissions, which, notably, may require too much time in such fast-moving networks.

Bit-Level Error Protection

The techniques herein selectively place application data bits into bit positions of symbols in order to offer better protection for priority information (such as control traffic versus data traffic), i.e., "unequal error protection" of application messages within communication frames due to a property of constellation maps used for symbol-to-bit-sequence mapping in a modulation scheme. For instance, the "approximate communication" techniques herein exploit the error structure inherent to modulation-based communication to natively protects higher priority data without consuming additional network or spectrum resources. In addition, since constellation maps differ in the level of protection available at different bit positions, the techniques herein also allow for the dynamic choice of a constellation map that depends on the relative utility of protecting different application bits differently.

Specifically, according to one or more embodiments of the disclosure as described in detail below, a device (e.g., a transmitter) determines a level of error protection of each bit position within symbols of a particular constellation map used for modulation-based communication, and also determines priority levels of application data bits to be placed into a communication frame. Application data bits may then be placed into symbols of the communication frame, where higher priority application data bits are placed into bit positions with greater or equal levels of protection than bit positions into which lower priority application data bits are placed. The communication frame may then be transmitted to one or more receivers with an indication of how to decode the placement of the application data bits within the symbols. In addition, in one or more specific embodiments, the particular constellation map may be dynamically selected from a plurality of available constellation maps, such as based on communication channel conditions and/or applications generating the data, and the one or more receivers may be informed of which particular constellation map to use to decode symbols of a transmitted communication frame.

Illustratively, the techniques described herein may be performed by hardware, software, and/or firmware, such as in accordance with the "protection" process 248/248a, which may contain computer executable instructions executed by the processor 220 (or independent processor of interfaces 210) to perform functions relating to the techniques described herein, e.g., in conjunction with general MAC or PHY processing for the underlying communication medium. For example, the techniques herein may be treated as extensions to conventional protocols, such as the various wireless communication protocols (e.g., IEEE Std. 802.11), and as such, may be processed by similar components understood in the art that execute those protocols, accordingly.

Figure 6:
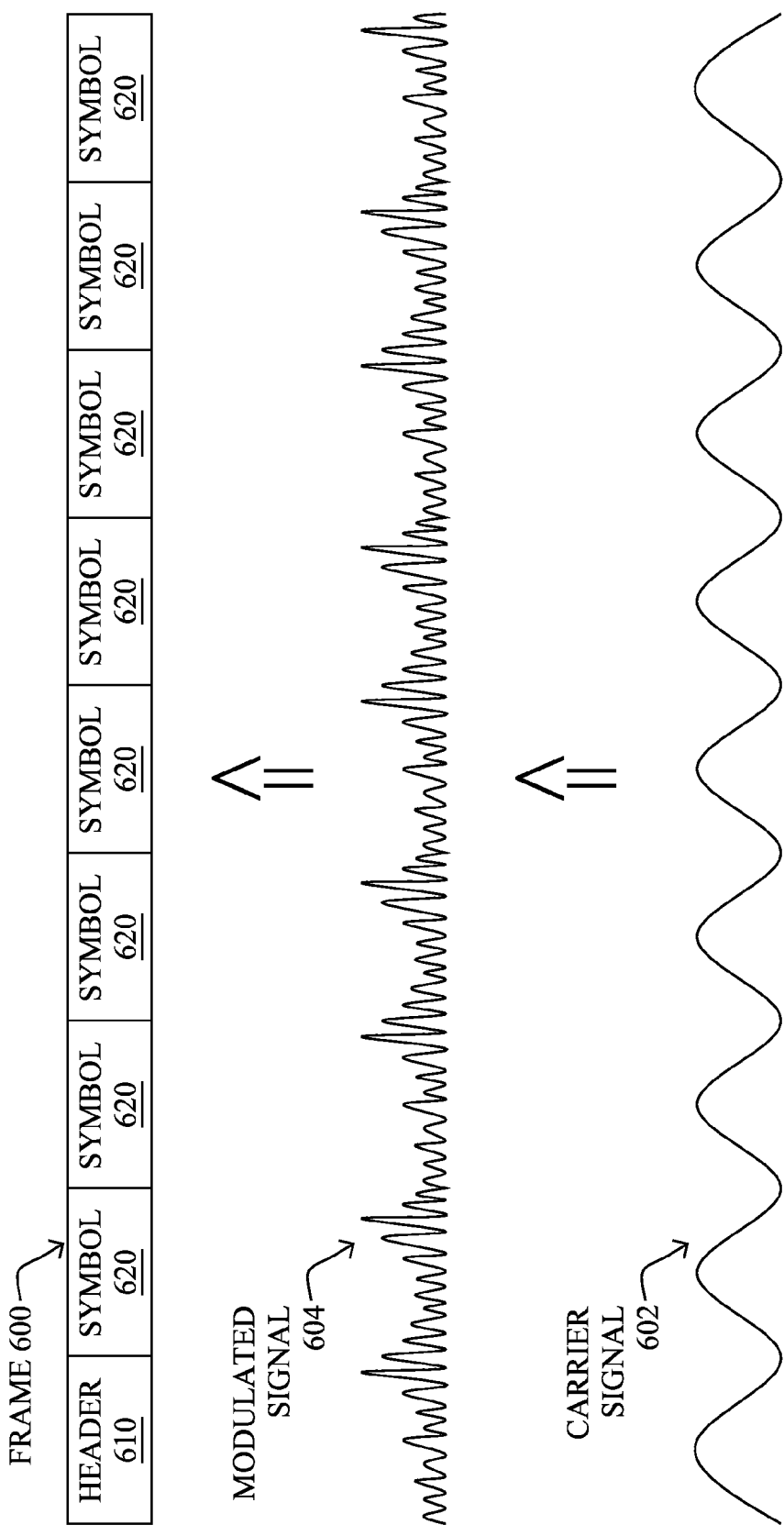
FIG. 6 illustrates an example communication frame.

Notably, shared-media communication environments most often utilize a modulation scheme to transmit data sets of bits as symbols, thus varying one or more properties of a periodic waveform, called the carrier signal, with a modulating signal which contains information to be transmitted. FIG. 6 illustrates a simplified example of a modulation-based communication frame 600, where a carrier signal 602, such as a channel, frequency, etc., may be modulated into a modulated signal 604 through various modulation schemes, such as, e.g., Quadrature Amplitude Modulation (QAM), Phase Shift Keying (PSK), Pulse Position Modulation (PPM), Frequency Shift Keying (FSK); and other modulation schemes that map digital bits to analog symbols, as will be understood by those skilled in the art. The modulated signal 604 represents the data to be transmitted in the frame 600, such as a header 610 and a payload of symbols 620.

Figure 7A:
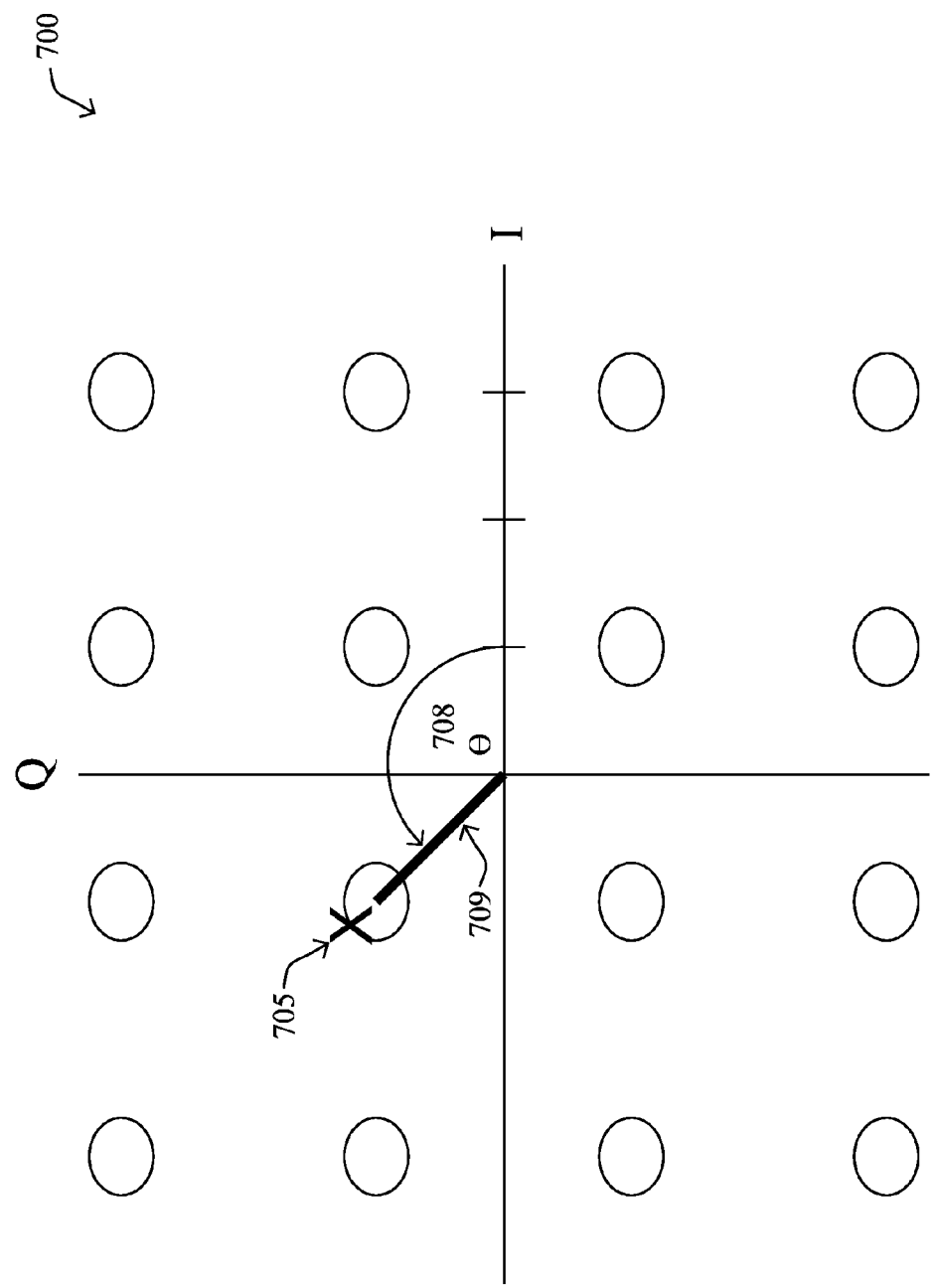
FIGS. 7A-7B illustrate examples of modulation-based communication.
Figure 7B:
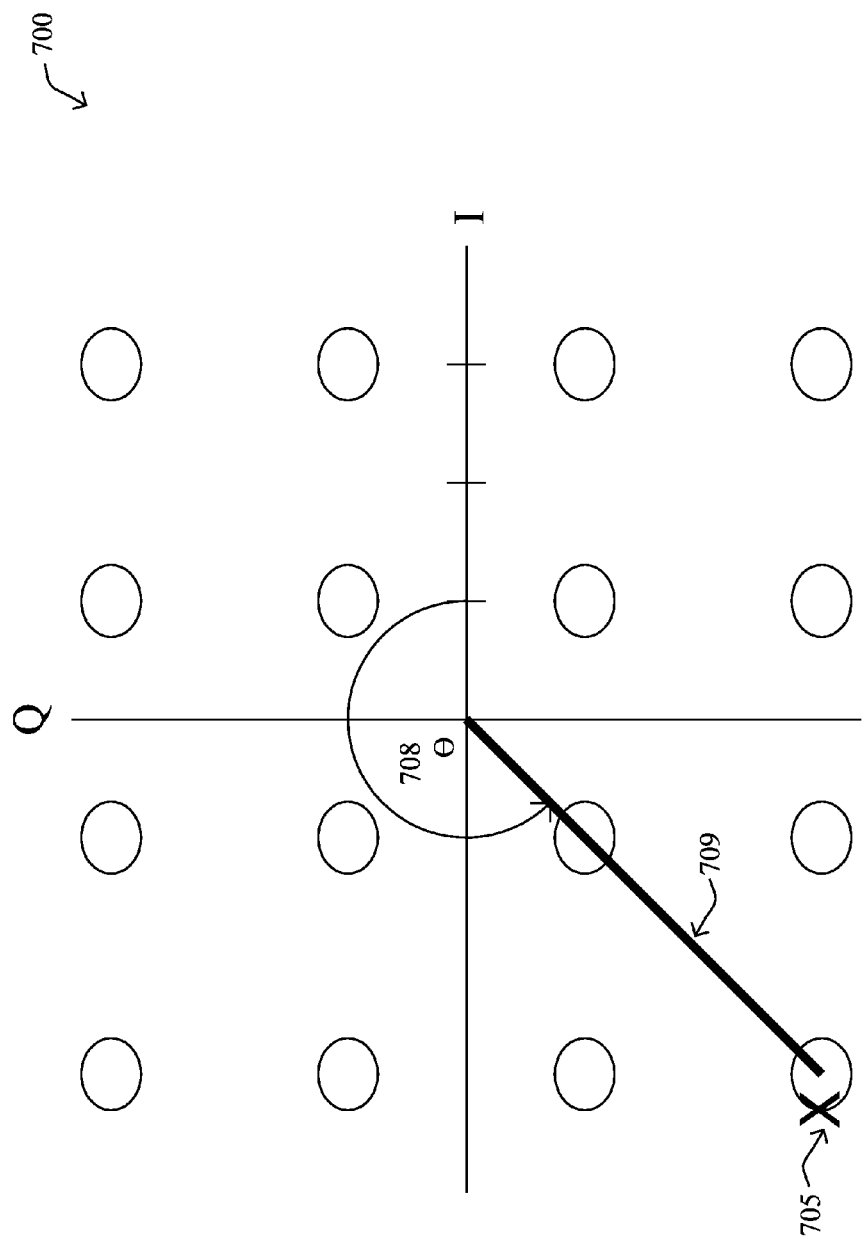

Generally, a modulation-based communication scheme may utilize a constellation map to convert the data of the frame 600 into the modulated signal 604 for transmission, and in the reverse for reception. FIGS. 7A and 7B illustrate example generic (coordinates only) constellation maps 700, where sixteen different symbols may be represented. In particular, a constellation map (or constellation diagram) is a representation of a signal modulated by a digital modulation scheme in a two-dimensional scatter diagram in the complex plane at symbol sampling instants. That is, as the symbols are represented as complex numbers, they can be visualized as points on the complex plane. The real and imaginary axes are often called the in-phase, or I-axis and the quadrature, or Q-axis.

As shown by the difference between FIG. 7A and FIG. 7B, by varying certain factors of the carrier signal 602, such as using modulating a cosine and sine carrier signal with the real and imaginary coordinates ("X" 705) for quadrature modulation, such as QAM, or else modulating the amplitude and phase of a single carrier signal ("A" 707 and "P" 708, respectively), the different constellation points may be represented by the modulated signal. To interpret a constellation map, upon reception of the signal, the receiver's interface (e.g., a demodulator) examines the received symbol, and selects, as its estimate of what was actually transmitted, the point on the constellation map 700 which is closest (e.g., in a Euclidean distance sense) to that of the received symbol.

Figure 8:
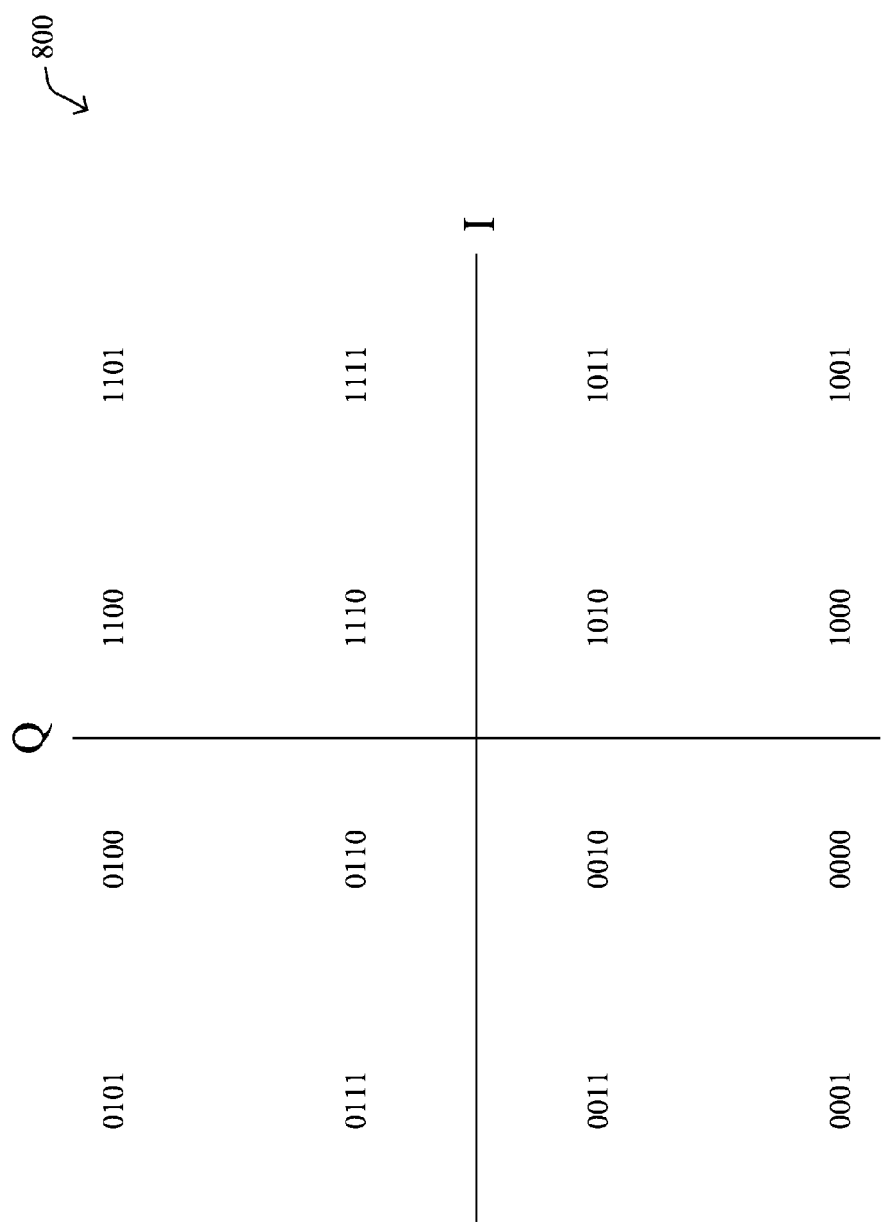
FIG. 8 illustrates an example constellation map.

As a specific example constellation map, FIG. 8 illustrates an example sixteen-symbol map 800 (e.g., for 16-QAM), where symbols of the map represent specific four-bit data sequences (e.g., "0101," "0100," etc.). Note that the example map is based on Gray coding (only one bit value changes between adjacent symbols), but this is not meant to be a limitation to the scope of the embodiments herein. That is, the techniques herein may be applied constellation maps arranged according to Gray code, block code, or other codes used in communication. Based on the combination of FIGS. 7A and 7B with the specific mapping of FIG. 8, therefore, the two four-bit values represented by the modulated signals would be "0110" and "0001," respectively.

Figure 9A:
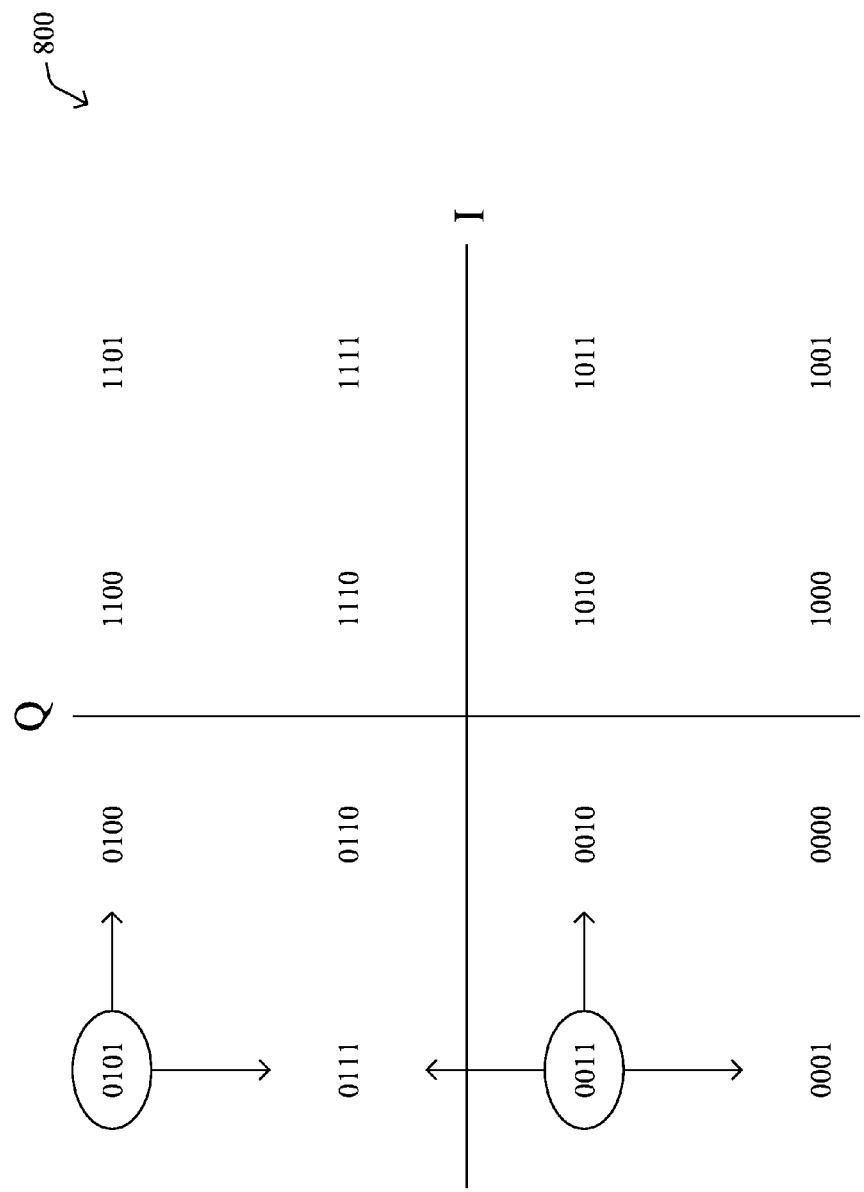
FIGS. 9A-9B illustrate example errors and levels of bit protection according to the constellation map in FIG. 8.
Figure 9B:
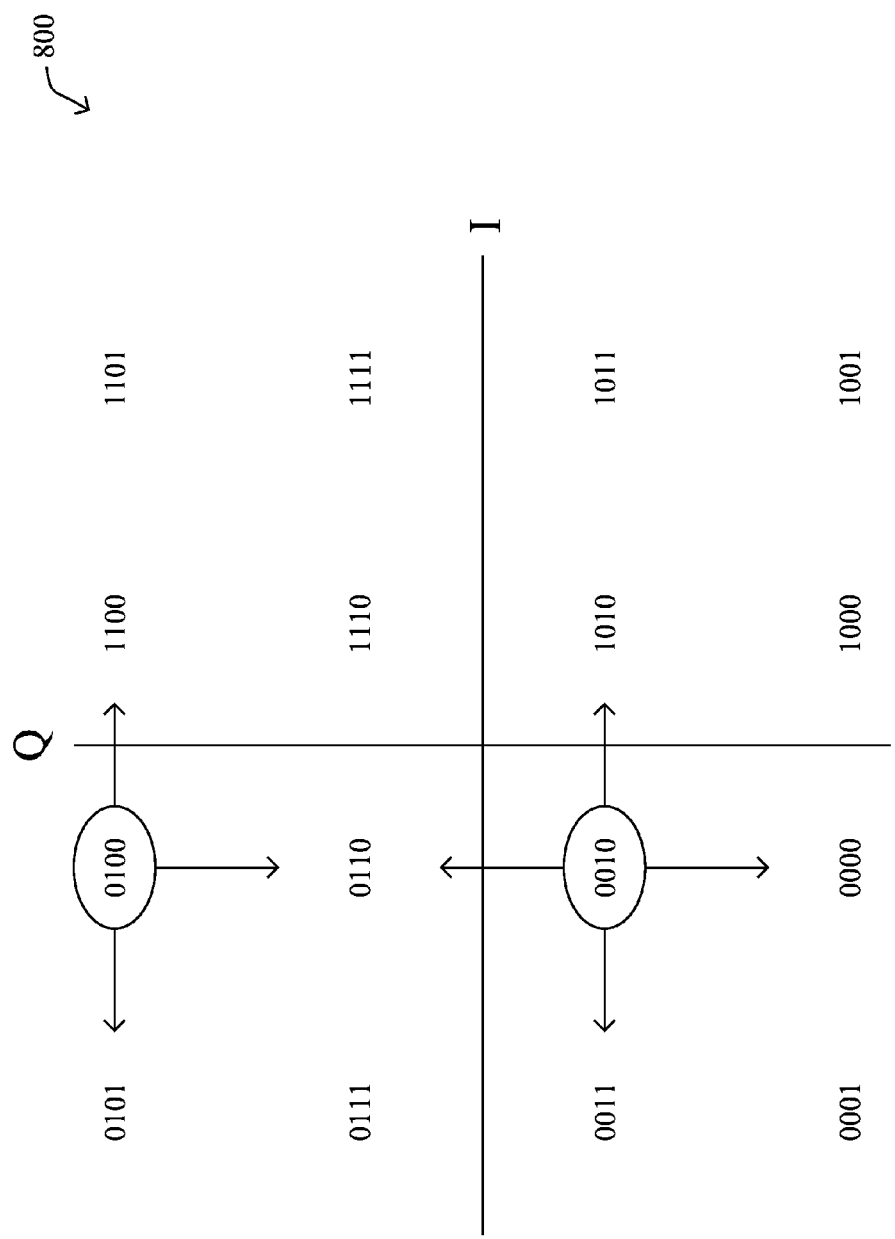

Note that since the signal may have been corrupted by the channel or the receiver (e.g., additive white Gaussian noise, distortion, phase noise, interference, etc.), however, the receiver may demodulate incorrectly if the corruption has caused the received symbol to move closer to another constellation point than the one transmitted. In particular, as shown in FIGS. 9A and 9B, deviation in coordinates due to the signal corruption may result in the interpreted value being shifted away from the actual value transmitted. For example, as shown in FIG. 9A, assuming that the original intent was to transmit the symbol for "0101" at the top left of the map 800, through various corruption factors (though maintaining an assumption that only one erroneous shift occurs), the possible interpreted outcomes in the event of an error could be any adjacent symbol, e.g., "0100" or "0111." Similarly, if attempting to transmit "0011," single units of error could result in "0111," "0010," or "0001." FIG. 9B illustrates similar error conditions, but from the perspective of transmitted symbols not located at an outer-most column of the map 800. Here, for example, transmitting "0100" may result erroneously in "0101," "0110," or "1100," while transmitting "0010" may result erroneously in "0110," "0011," "0000," or "1010."

Notice that various common constellation maps, e.g., the Gray code (used in 802.11) map bit sequences to symbols in a way that increases the resilience of certain bits, even when the symbols are in error. For example, the Gray code corresponding to a 16-QAM constellation as described above in FIG. 8 shows that the most-significant bit (MSB) of the different symbols to the left of the Q-axis, all have a value of "0." Similarly, the MSB of different symbols to the right of Q-axis all have a value of 1. In such a case, if a decoding error occurs for any symbol in the outer-most column of the constellation map, as in FIG. 9A, there are no errors in the MSB (again, under the assumption that symbol errors do not exceed 1 unit). For the remaining symbols, i.e., of internal columns, an error probability of either ¼ or ⅓ for the MSB can be expected (where the error actually affects the resultant MSB), as shown in FIG. 9B, depending on its position in the constellation. If the likelihood of transmitting each symbol is identical, then the probability of error in the MSB, given a symbol error has occurred, is ⅙ (officially, eight in forty-eight, or 8/48, adjacent possible error conditions in the sixteen-symbol map would result in a change in the MSB). In the specific constellation map 800 shown, the same probability (⅙) is true for the second-most-significant bit. For the two other bits, i.e., the second-least-significant bit and the least-significant bit (LSB), on the other hand, the probability of making an error, given a symbol error has occurred, is ⅓ (16/48 errors result in changed bit values).

Figure 10:
FIG. 10 illustrates another example constellation map.

Each constellation map provides a varying degree of protection for different bit positions of a symbol. For example, with reference to an alternative constellation map "800-A" as shown in FIG. 10, similar analysis will show that for the bit positions from MSB to LSB, the four corresponding error probabilities are ⅙, ⅓, ⅙, and ⅓, respectively. Other specific constellation maps, as well as other map schemes (e.g., block code versus Gray code) may result in different levels of protection for the corresponding bit positions within the symbols (and notably need not be limited to ⅙ or ⅓ error probabilities). For instance, block code constellation maps may provide greater error protection to the MSBs than Gray code constellation maps, but at the cost of lower protection to the LSBs for both ambient noise and varied external interference environments.

Note that many, if not most, constellation maps offer greater error protection to the MSB(s) than the LSB(s) (with or without PHY convolution codes), however, this need not be limiting to the embodiments described herein, such that any bit position may have a greater level of protection than any other bit position. Also, while differential error protection/resilience of bit positions is shown with the example of QAM-based modulation, the same would hold for other modulation schemes such as PSK, PPM, FSK, etc. as well.

"Unequal Error Protection" (UEP), i.e., the observation that certain bit positions are less likely to be in error than other bit positions, is thus a property of constellation maps used for symbol-to-bit-sequence mapping in a modulation scheme, regardless of the modulation schemes (QAM, PSK, PPM, FSK, etc.). According to the techniques described herein, by determining a level of error protection of each bit position within symbols of a particular constellation map used for modulation-based communication, bits of varying priority levels may be placed within a frame 600 in a manner that protects the higher priority bits more than the lower priority bits. That is, if an application identifies different priority levels for its various data bits, then instead of performing data bit placement (mapping these data bits to bit positions in symbols) in an agnostic manner, the techniques herein can achieve differential data protection by placing the higher priority data bits to the more-protected bit positions of symbols, and the lower priority data bits to the less-protected positions. Note that such differential protection of data values is possible by placing the data bits to appropriate bit positions, and without adding any form of redundancy or overhead (much) into the system. This is in contrast to the traditional FEC-based methods for providing UEP that require communication of additional bits that redundantly encode more important data.

Figure 11:
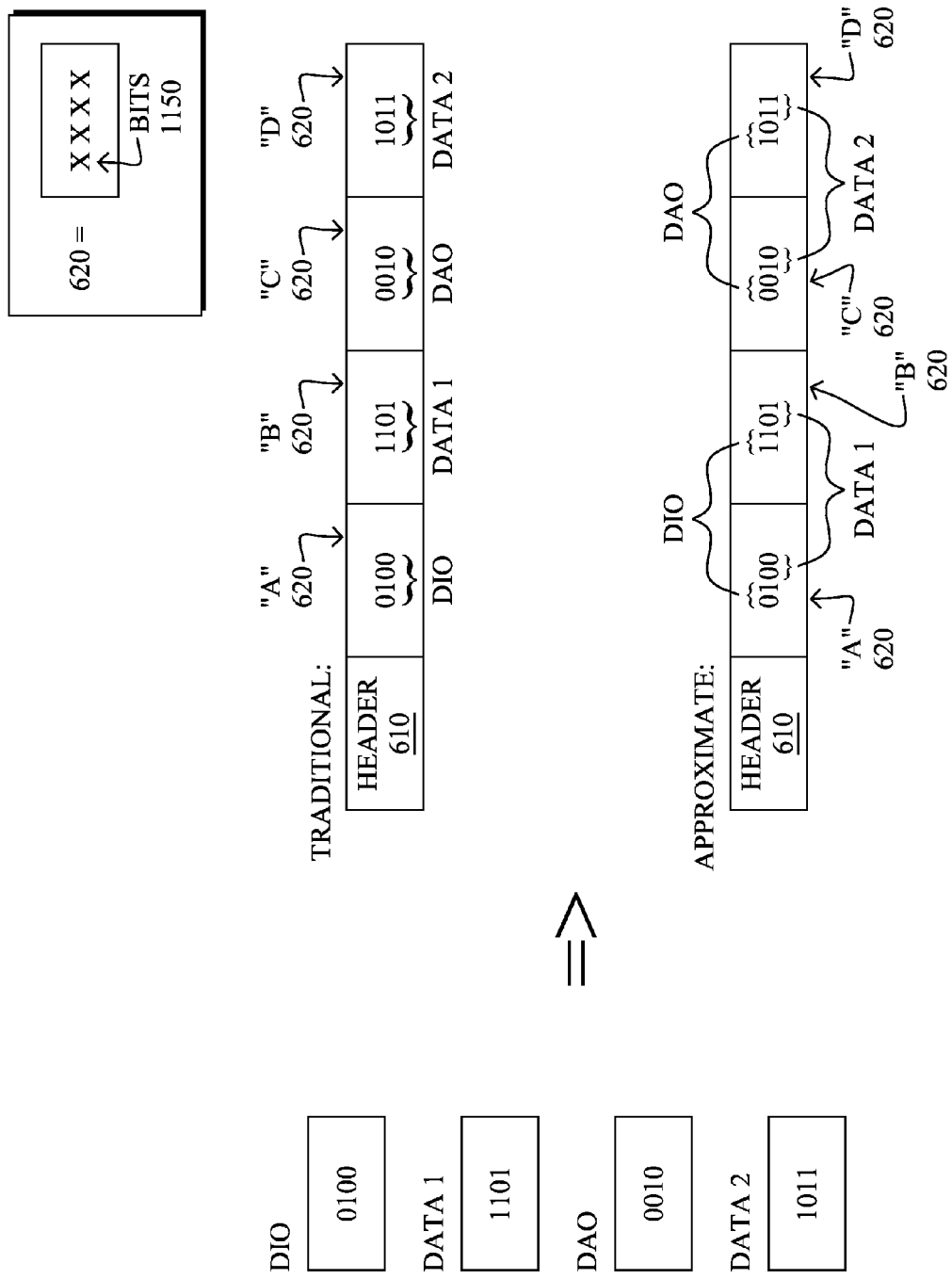
FIG. 11 illustrates an example of bit placement within symbols of a communication frame for bit-based protection.

FIG. 11 illustrates a simplified example of a communication frame according to the "approximate communication" described herein, which selectively places bits 1150 from data of different priority levels. Assume that the example constellation map is based on map 800 of FIG. 8, such that the first two MSBs thus offer a better level of protection than the two LSBs. Also assume that there are four different application data bit sets, e.g., two control messages and two data messages being sent at the same time. For instance, as a specific non-limiting example, RPL creates and continuously sends data bits corresponding to control messages (DIOs and DAOs), and also sends upper-layer data down the network protocol stack. Bits from each control messages and upper-layer data will then be packetized into the symbols at the network and MAC layers, and then will be handed into the digital component of the PHY layer. By determining the priority levels of application data bits to be placed into a communication frame, the transmitter may place those application data bits into symbols of a communication frame in a manner such that higher priority application data bits are placed into bit positions with greater or equal levels of protection than bit positions into which lower priority application data bits are placed.

As shown in FIG. 11, therefore, assume four simplified four-bit messages—one DIO message with data "0100," one DAO message with data "0010," and two data messages (Data 1, Data 2) with data "1101" and "1001," respectively. In traditional communication systems, the 4-bit sequences of each message get placed together into a single wireless frame 600, e.g., the DIO message is mapped to the first symbol (consisting of a single symbol "A"). The key difference in approximate communication according to the techniques herein is that application data bits from of different priority levels (different applications/messages) may be placed together and combined into a single symbol, such that the most protected bit positions are occupied by the higher priority data bits (say, DIO message bits), and the least protected bit positions are occupied by the lower priority data bits (say, Data 1 and Data 2 bits).

For example, the first two bits of the DIO message, i.e., "01," are mapped to MSBs (first two bits) of the first symbol "A" of a wireless frame, while the second two bits of the same DIO message, i.e., "00," are mapped to the MSBs of the symbol "B" of the frame. Similarly, the first two bits of the DAO message, i.e., "00," are placed into the MSBs of the third symbol "C," while the last two bits of the DAO message, i.e., "10," are placed in to the MSBs of the fourth symbol "D." On the contrary, the bits of Data 1 and 2, which are lower priority than the control messages, may be placed into the LSB positions of the different symbols as shown. Overall, this means the control messages (DIO-message and DAO-message) bits will be better protected than the Data 1 and Data 2 bits. This is particularly useful, since once the control message is received and decoded, the application may make use of the message; an important feature in fast-moving networks and/or constrained networks. Therefore, if any error were to occur during transmission/decoding of the frame 600, it is more likely that the error affects the lower priority data, accordingly.

Figure 12A:
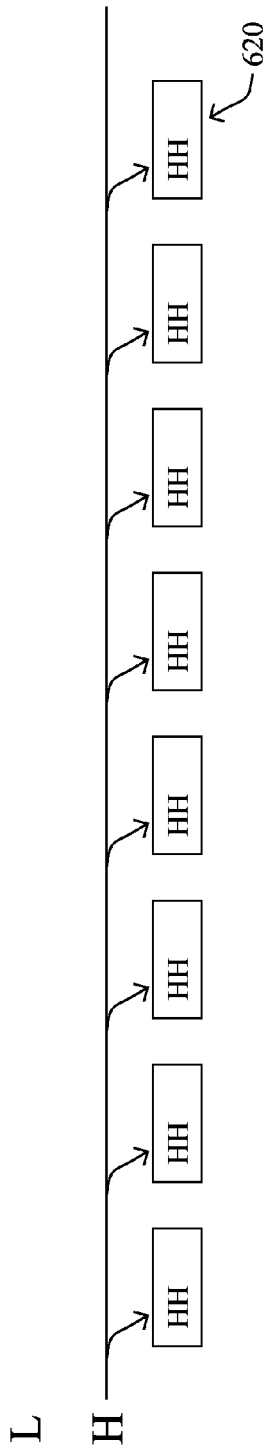
FIGS. 12A-12C illustrate another example of bit placement within symbols of a communication frame for bit-based protection.
Figure 12B:
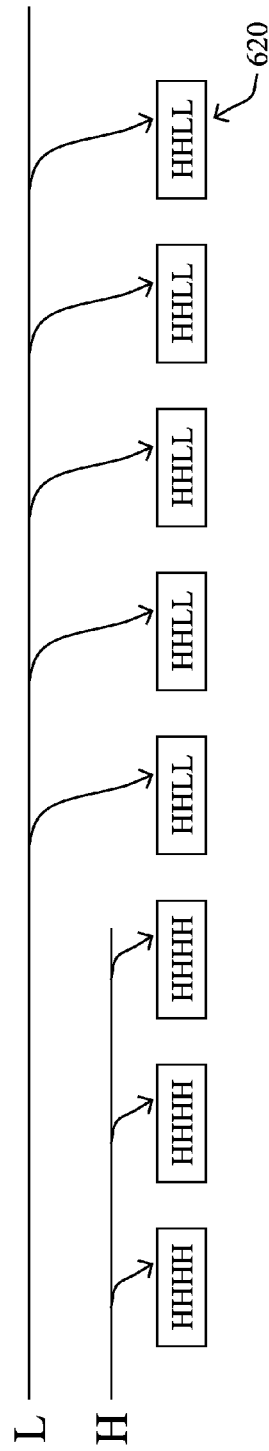
Figure 12C:
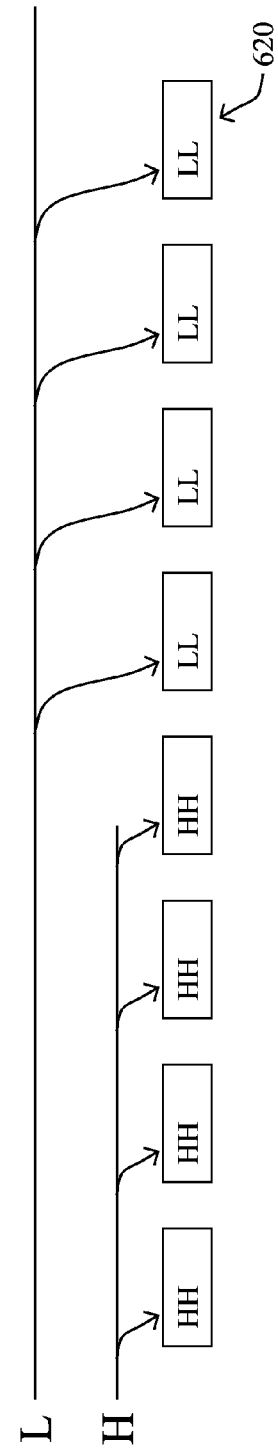

In greater detail to the example above, in accordance with one or more embodiments herein, once a constellation map has been chosen, and the per-bit levels of protection have been determined, the techniques herein may apply a "greedy" application data bit placement scheme to place application data bits to various protection levels to maximize value of protected data. In particular, the transmitter may place bits in order of priority into bit positions in order of levels of protection, e.g., as described as follows. Given x data bits to place within a frame (across all priority levels), and m bits per symbol, the total number of symbols needed is x/m. As shown in FIG. 12A, the "greedy" placement procedure starts by placing the highest priority bits "H" (e.g., higher priority control-based application data bits—control messages, such as DIO/DAO messages 300) into the most protected bit positions of each of these symbols (still assuming that the MSBs offer better protection than the LSBs in FIG. 12A, e.g., based on ⅙ and ⅓ error probabilities, respectively). The algorithm moves to the next protected bit position(s) if the most protected bit positions are exhausted, as shown in FIG. 12B. Once we complete in assigning all highest priority bits, we move to bits at the next priority level (e.g., with lower priority data-based application data bits), as also shown in FIG. 12B, continuing to place the bits in order of priority into positions in order of levels of protection until placing all bits. Note that as shown in FIG. 12C, lower priority bits may be placed in equal protection bit positions where such positions remain unused after placing the higher priority application data bits.

Figure 13A:
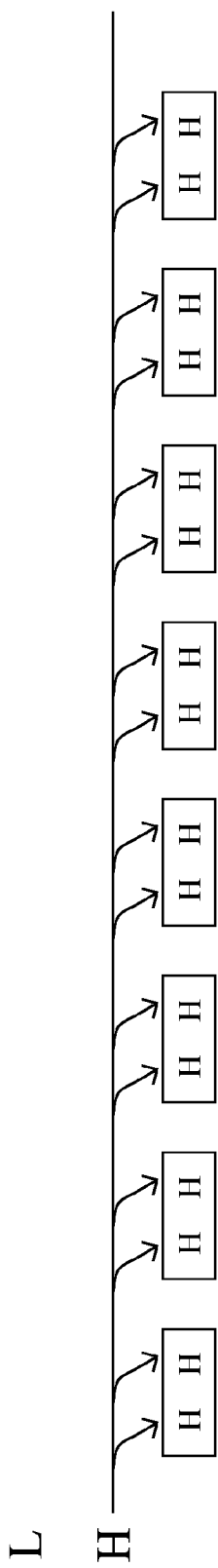
FIGS. 13A-13B illustrate still another example of bit placement within symbols of a communication frame for bit-based protection.
Figure 13B:
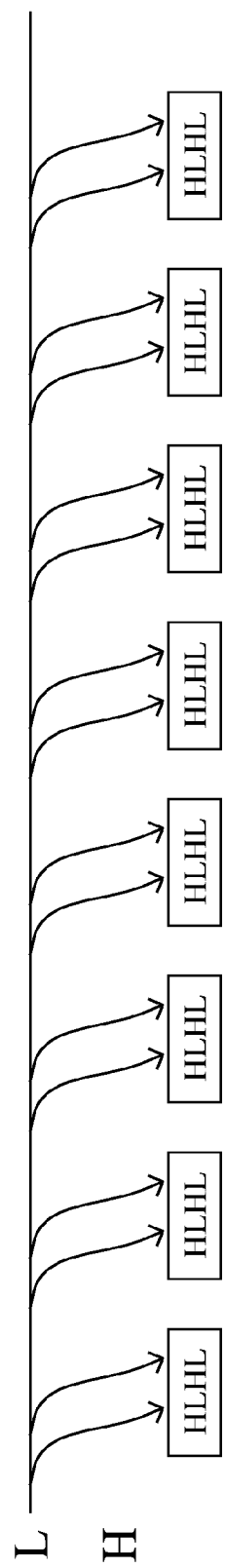

Further, as shown in FIGS. 13A-13B, the different constellation maps, such as the map from FIG. 10, may produce different levels of security for the various bit positions, and as such, a different pattern of bit placement would correspondingly result (e.g., the first and third bit positions carrying the greatest level of protection). Moreover, while FIGS. 12A-13B illustrate two priority levels, e.g., high and low, any number of priority levels may be used, and placed within the bit positions in order of highest priority to lowest priority. Further still, each bit position may have a different level of protection, such as three or four different levels of protection or more, and as such, the application data bits need not be placed into a symbol two-at-a-time as in the figures above, but rather may be individually placed into each symbol by order of the protection levels.

Placing application data bits to the protected bit positions in a given constellation map based on application data priority level provides for added resiliency, robustness, and guarantee to the delivery of higher priority data. In addition to this, however, the techniques herein continue further by switching dynamically between constellation maps based on applications providing the data bits and communication channel conditions to further improve the throughput. That is, according to one or more embodiments herein, the particular constellation map used to encode the data may be dynamically selected from a plurality of available constellation maps (where the receivers are informed of which particular constellation map to use to decode the symbols). For example, for selection based on applications, it can be determined that different kinds of data (e.g., video in which the make-up of I, P, B frames in an MPEG-based video stream differ, as may be appreciated by those skilled in the art) can result in different protection performance from different constellation maps. Furthermore, dynamic constellation map switching (e.g., between certain Gray and Block codes) that is aware of the underlying channel condition also provides added performance.

Figure 14:
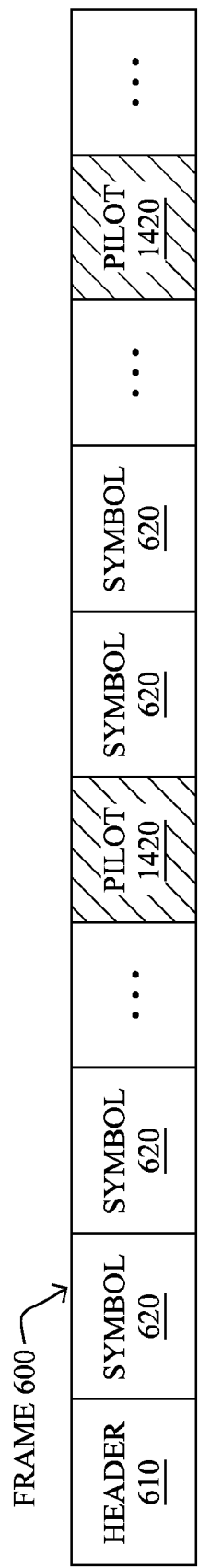
FIG. 14 illustrates an example communication frame with pilot symbols.

To dynamically switch between constellation maps, the techniques herein may first determine the communication channel conditions, that is, obtaining the "utility" of a constellation map over a particular channel. Illustratively, the utility of a constellation map may be obtained by estimating the bit error rates (BERs) at different bit positions for different constellation maps. For this, the transmitter may add a small number of known pilot symbols into each transmitted frame to the receivers. For example, as shown in FIG. 14, pilot symbols 1420 may be added to frames 600 at various intervals. Note that the overhead increases as the number of pilot symbols increases, although the accuracy of the BER values also increase with more pilot symbols. A configured tradeoff may be reached by a corresponding protocol, though an example ratio herein provides for 1-in-100 symbols 620 to be pilot symbols 1420, chosen to strike a balance between overhead and accuracy.

Figure 15:
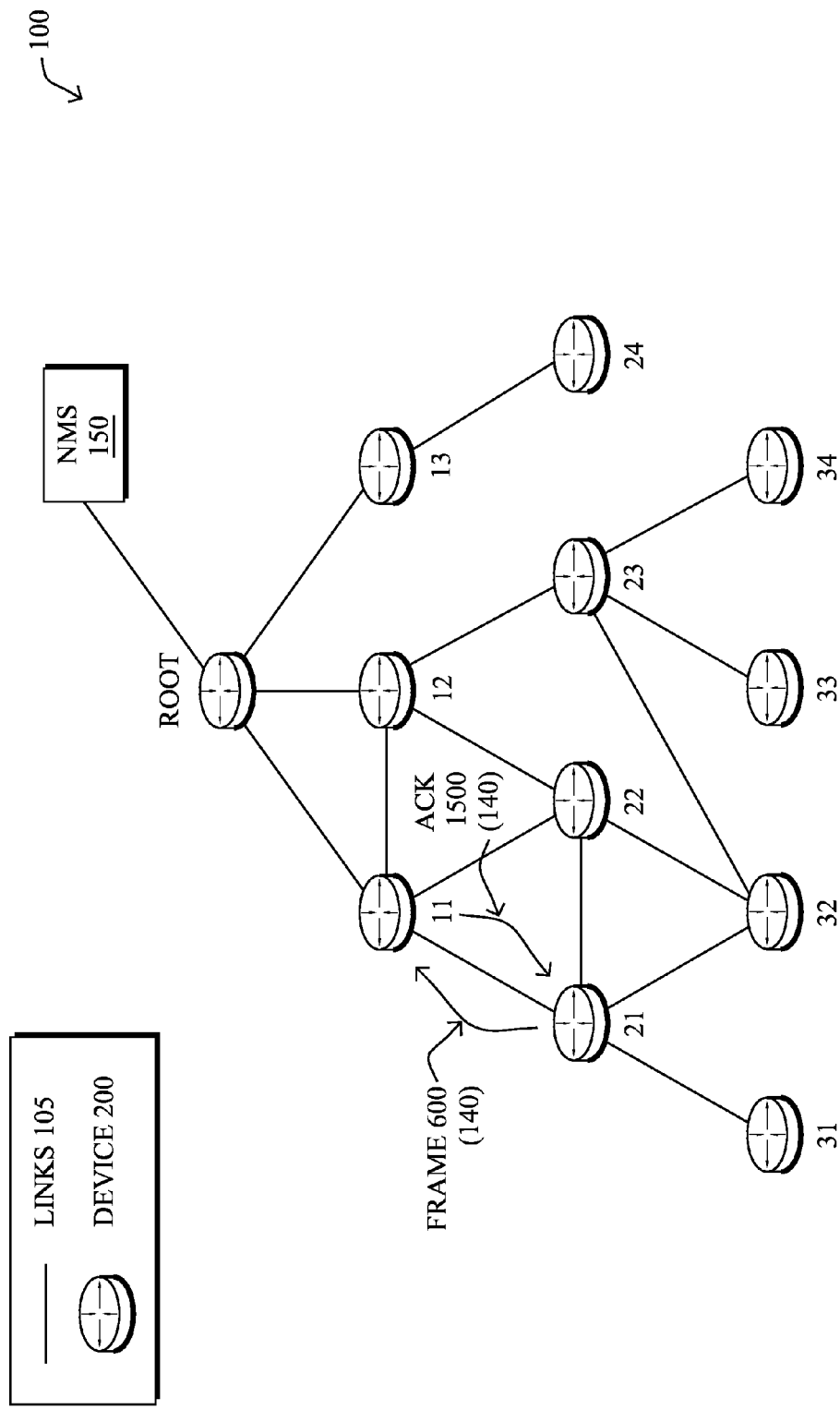
FIG. 15 illustrates an example message exchange.
Figure 16:
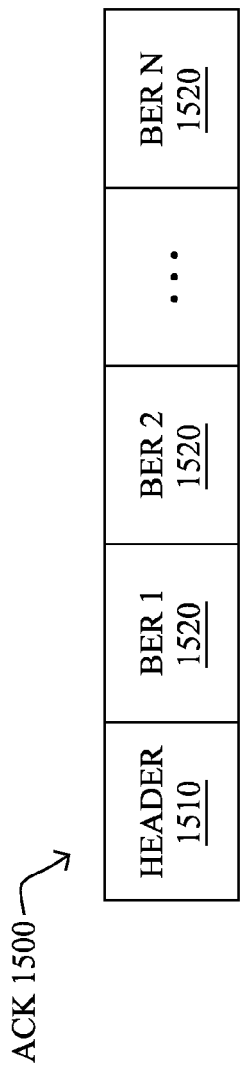
FIG. 16 illustrates an example acknowledgment message.
Figure 17:
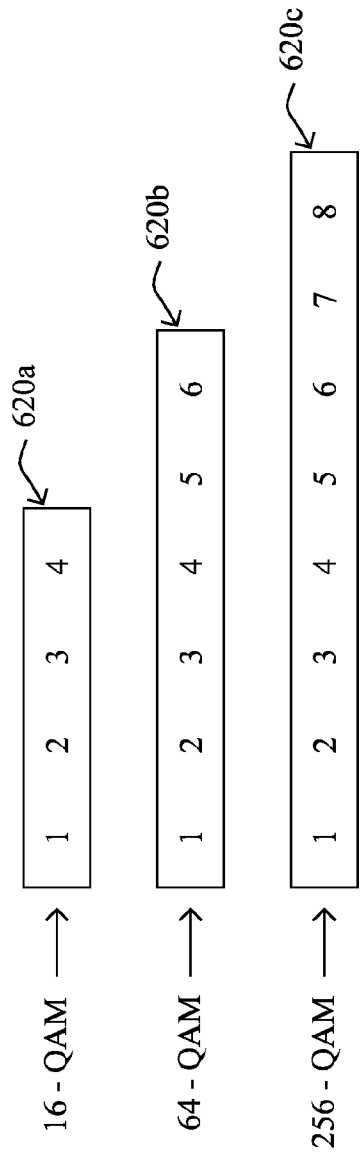
FIG. 17 illustrates examples of symbol sizes for different modulation schemes.

As illustrated in FIG. 15, the frames 600 may be transmitted between devices (e.g., from node 21 to node 11), and the receiver (e.g., node 11) is configured to decode the pilot symbols 1420 using the plurality of constellation maps in consideration, e.g., Gray and Block codes. Since the pilot symbols are known, the receiver can estimate the BERs for different positions and provide this as a feedback, such as in an 802.11-style acknowledgement (ACK) frame/message 1500. Note that such BER computation may occur at transmission speeds, as such computation already occurs for wireless frame decoding and ACK generation. Illustratively, as shown in FIG. 16 (showing an example ACK message 1500), in addition to the ACK header 1510, a single byte may be used to carry each BER value 1520 of the various bit positions "1" through "n" (e.g., MSBs, mid-level-bits, and LSBs). For example, as shown in FIG. 17, 16-QAM contains four bits per symbol 620a, 64-QAM contains six bits per symbol 620b, and 256-QAM contains eight bits per symbol 620c. Accordingly, an overhead of BER values 1520 within the ACK message 1500 consists of four, six, or eight additional bytes, respectively.

Upon receiving the BER values 1520 from the receiver(s) for each of the bit positions of the pilot symbols 1420, i.e., for each of the plurality of constellation maps, the transmitter may then determine the communication channel conditions, accordingly. For example, in one specific illustrative embodiment, the transmitter may calculate the utility, u(E), of a constellation map, E, as follows. Let vi be the BER value associated with application data units at the ith priority level. Let pj indicate the protection level of the jth significant bit position group and let xij be the number of application data units with priority level i be allocated to bit positions with protection level j (e.g., using the "greedy" approach described above). Then, u(E)=Sum for all i (vi×sum for j (pj×xij)), where vi is presented as an input from the application. xij is obtained from the bit mapping strategy, and can also be computed per constellation map, and pj is received as feedback in the ACK frame. A constellation map that maximizes the u(E) value may then be the one that is dynamically selected.

Figure 18:
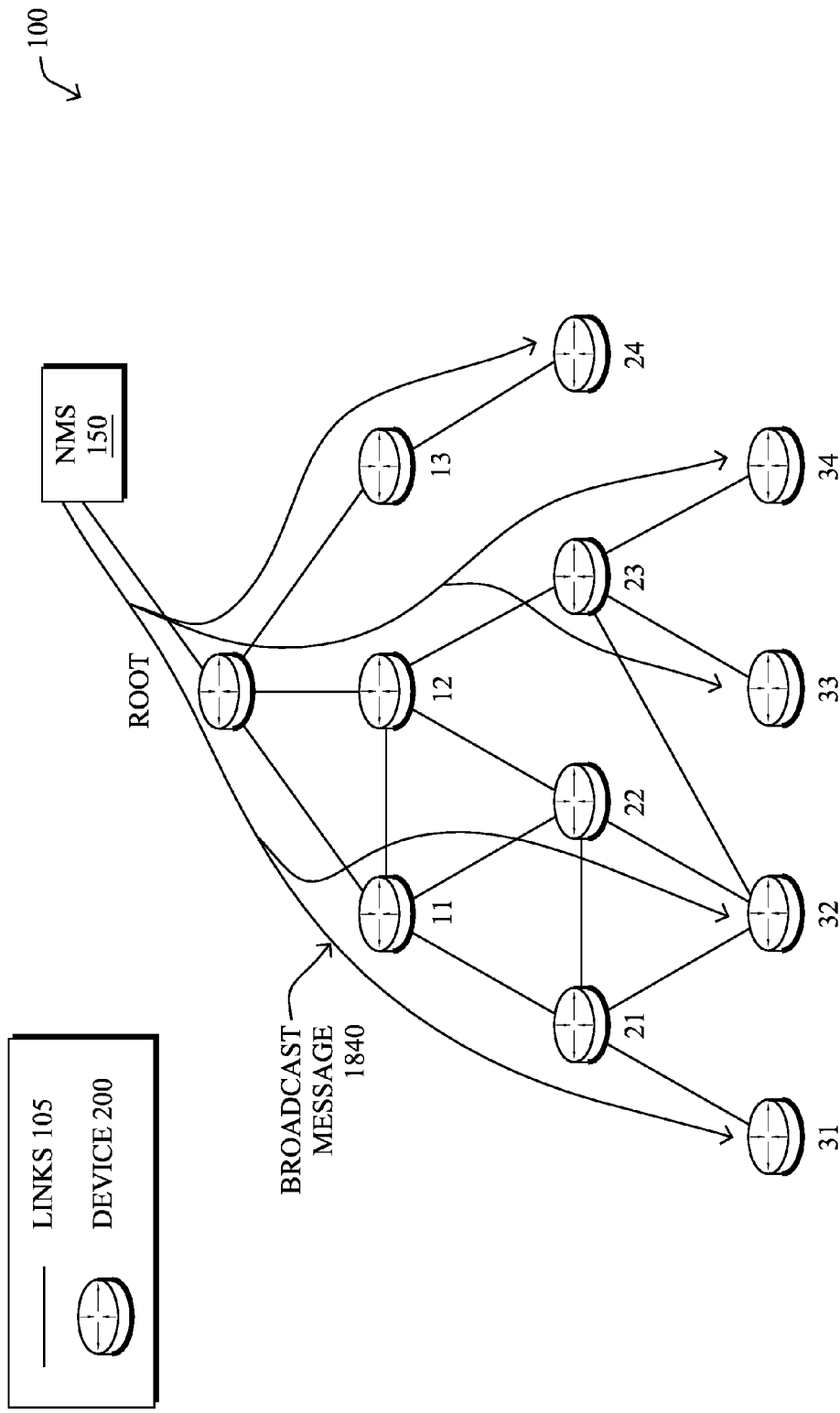
FIG. 18 illustrates an example distributed message exchange.

In yet another embodiment, the efficiency of the constellation map (illustratively measured based on the BER) may be provided to the Network Management System (NMS) 150 that is responsible for the network. As such, the NMS 150 may consequently determine the most appropriate scheme, and, as shown in FIG. 18, may in turn broadcast a message 1840 to all nodes in the network to dynamically select the required scheme for the whole network. In other words, the particular constellation map may be dynamically selected by a network management device (e.g., NMS 150), based on various factors including received BERs from within the network. Accordingly, the devices (nodes 200) in the network may receive the particular constellation map in messages 1840, where the particular constellation map is thus shared among all devices of a communication network.

Figure 19:
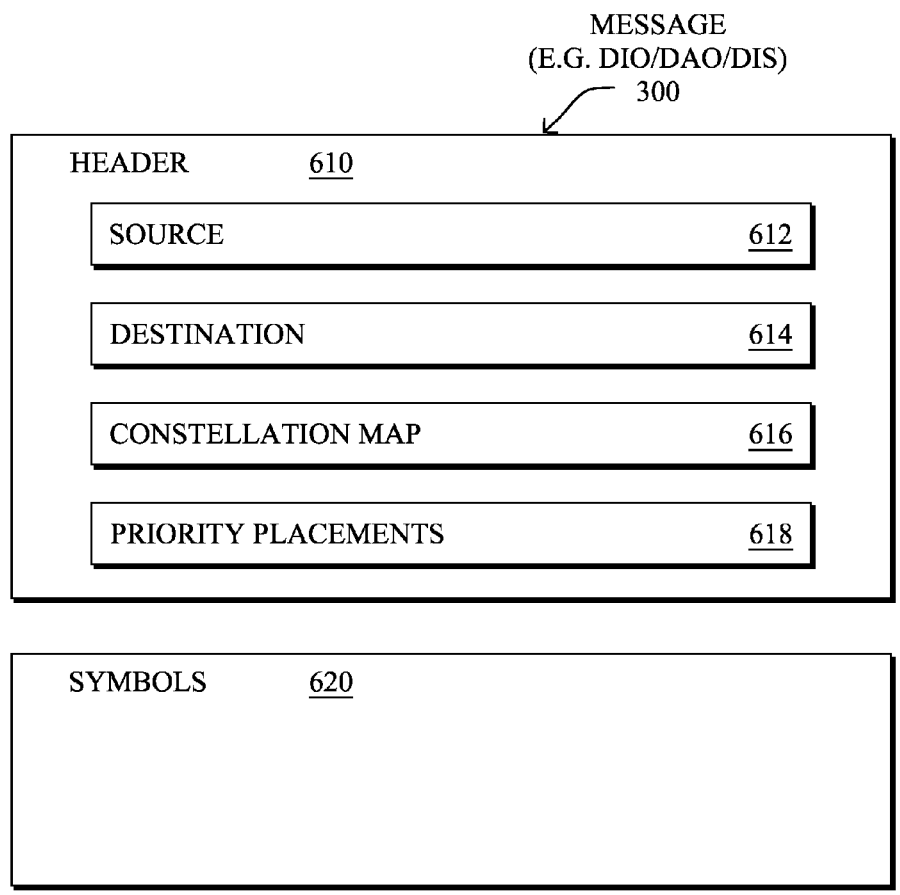
FIG. 19 illustrates another example view of a communication frame as in FIG. 6.

According to one or more embodiments herein, a few modifications may be made to the physical layer convergence protocol (PLCP) header 610 of the frame 600. In particular, according to the techniques herein, when transmitting the communication frame 600 to the receiver(s), the transmission may include an indication of how to decode the placement of the application data bits within the symbols. In one embodiment, for example, as shown in FIG. 19, in addition to some generally standard addressing or labeling (such as source address 612 and destination address 614), the header 610 of a frame may comprise a constellation map selector 616 to inform the receiver which encoding scheme is used in the frame. An illustrative two-bit field 616 limits the number of constellation map alternatives to four, but in most environments, it is believed that this would be sufficient.

In addition, added information with regard to how the data of different priority levels were placed into various bit positions using the techniques above may also be included within header 610, namely within the priority placements field 618. For example, this field 618 may be simply expressed by indicating the number of bytes (e.g., expressed in multiples of eight bytes) in each priority level, and the receivers may then decode the placement of the application data bits within the symbols by partitioning the placement of application data bits in reverse (i.e., according to the algorithm used to place the bits at the transmitter, e.g., as described above). In one specific embodiment, the number of priority levels may be limited to four, such that a one-byte field may be added to the header 610 for each level, for a total of four additional bytes. (Note that this may limit the maximum payload size to 2048 bytes.)

In one or more specific embodiments, the constellation map selector 616 may be placed in the "early part" of the header 610 to be transmitted at a base data rate, e.g., IEEE Std. 802.11a uses binary phase shift keying (BPSK) with ½ PHY convolution codes, and using a pre-defined constellation map. Once the dynamically selected constellation map is discovered, then the priority level size fields 618 may be located in the "latter part" of the header 610, and may be transmitted at higher data rates along with the rest of the frame 600 (symbols 620). Hence, although the header 610 may increase in size (e.g., from 40 bits to 72 bits), only a portion of the increase (e.g., two of these additional bits) are transmitted at the base rate.

Figure 20:
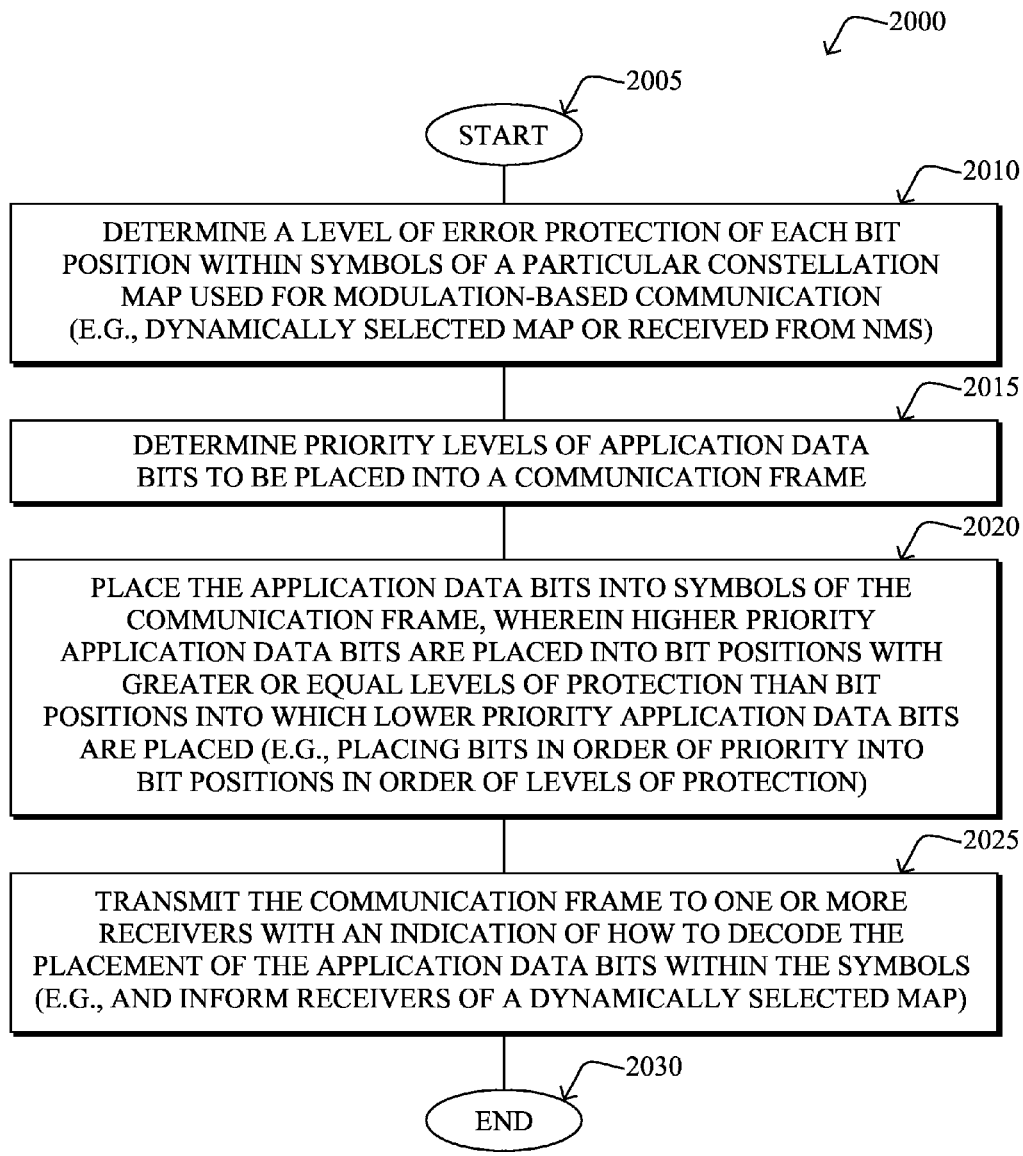
FIG. 20 illustrates an example simplified procedure for bit-based protection for modulation-based communication, particularly from the perspective of a transmitting device.

FIG. 20 illustrates an example simplified procedure for bit-based protection for modulation-based communication in accordance with one or more embodiments described herein, particularly from the perspective of a transmitting device. The procedure 2000 may start at step 2005, and continues to step 2010, where, as described in greater detail above, a device may determine a level of error protection of each bit position within symbols 620 of a particular constellation map 800 used for modulation-based communication. In particular, the device may dynamically select the map (e.g., as described in FIG. 21 below), or else may receive the map (e.g., also dynamically selected) from an NMS 150, as mentioned above. Depending upon the particular applications transmitting data, in step 2015 the device may also determine priority levels of application data bits 1150 to be placed into a communication frame 600. According to the priority levels, e.g., and number of total bits per priority level, the device may then place the application data bits into symbols of the communication frame in step 2020, where higher priority application data bits are placed into bit positions with greater or equal levels of protection than bit positions into which lower priority application data bits are placed. For example, in one embodiment as described above, the device may place bits in order of priority into bit positions in order of levels of protection. The communication frame may then be transmitted in step 2025 to one or more receivers with an indication of how to decode the placement of the application data bits within the symbols, and, in a specific embodiment herein, also informing the receivers of the dynamically selected map. The procedure 2000 may illustratively end in step 2030, though may return to steps 2010 to determine a new map, 2015 to determine priority levels for new data, or 2020 to continue placing additional bits into additional communication frames.

Figure 21:
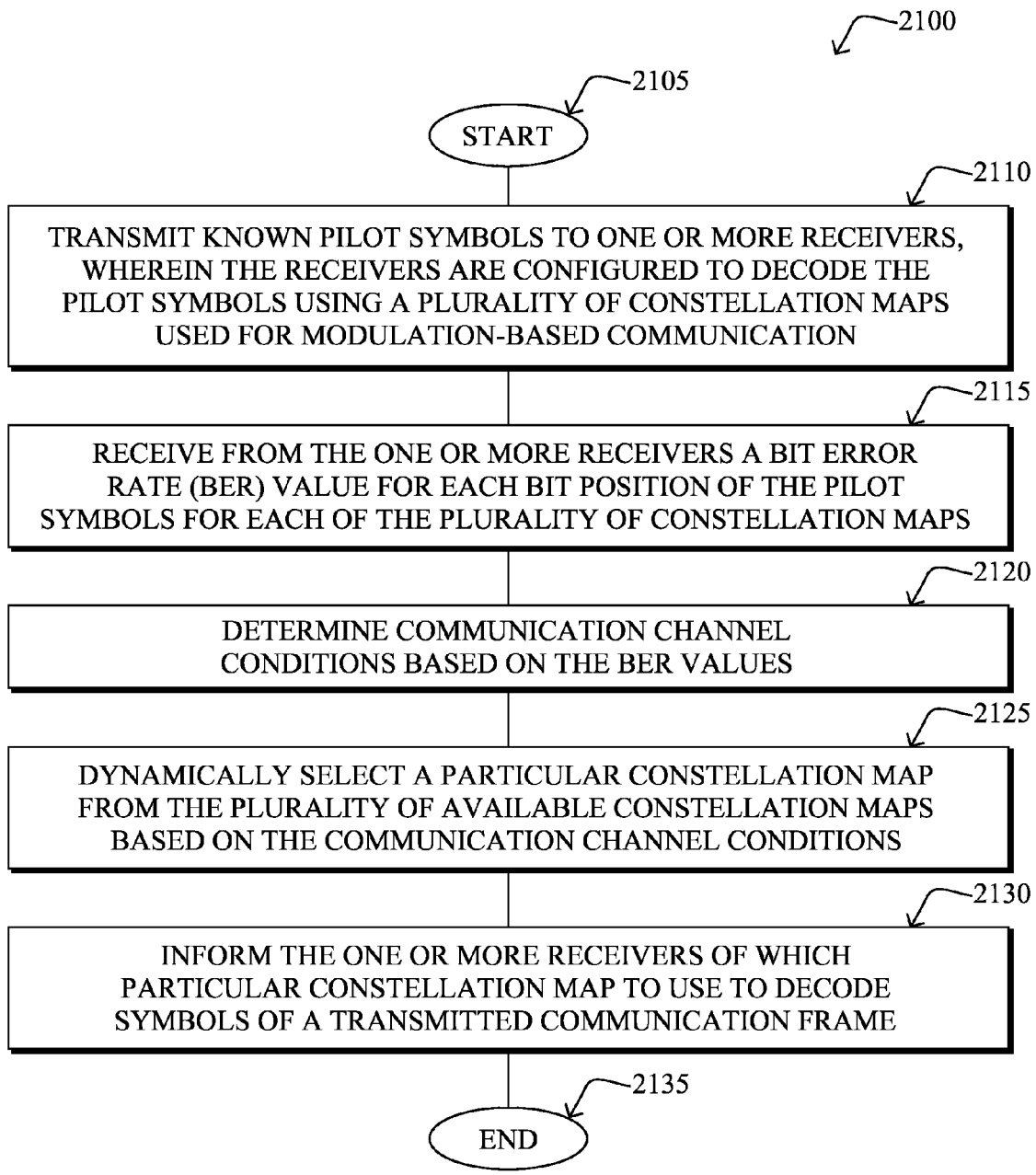
FIG. 21 illustrates another example simplified procedure for bit-based protection for modulation-based communication, particularly for dynamically selecting the constellation map from the perspective of a transmitting device.

As mentioned, FIG. 21 illustrates another example simplified procedure for bit-based protection for modulation-based communication in accordance with one or more embodiments described herein, particularly for dynamically selecting the constellation map from the perspective of a transmitting device. The procedure 2100 may start at step 2105, and continues to step 2110, where, as described in greater detail above, the device may transmit known pilot symbols 1420 to one or more receivers, where the receivers are configured to decode the pilot symbols using a plurality of constellation maps used for modulation-based communication. Accordingly, in step 2115, the device receives from the one or more receivers a BER value 1520 for each bit position of the pilot symbols for each of the plurality of constellation maps (e.g., in an ACK 1500). Based on the BER values, the device may then determine communication channel conditions in step 2120, and may then dynamically select a particular constellation map from the plurality of available constellation maps in step 2125 based on the communication channel conditions. Accordingly, in step 2130, the device may then inform the one or more receivers of which particular constellation map to use to decode symbols of a transmitted communication frame, and the illustrative procedure 2100 ends in step 2135.

Figure 22:
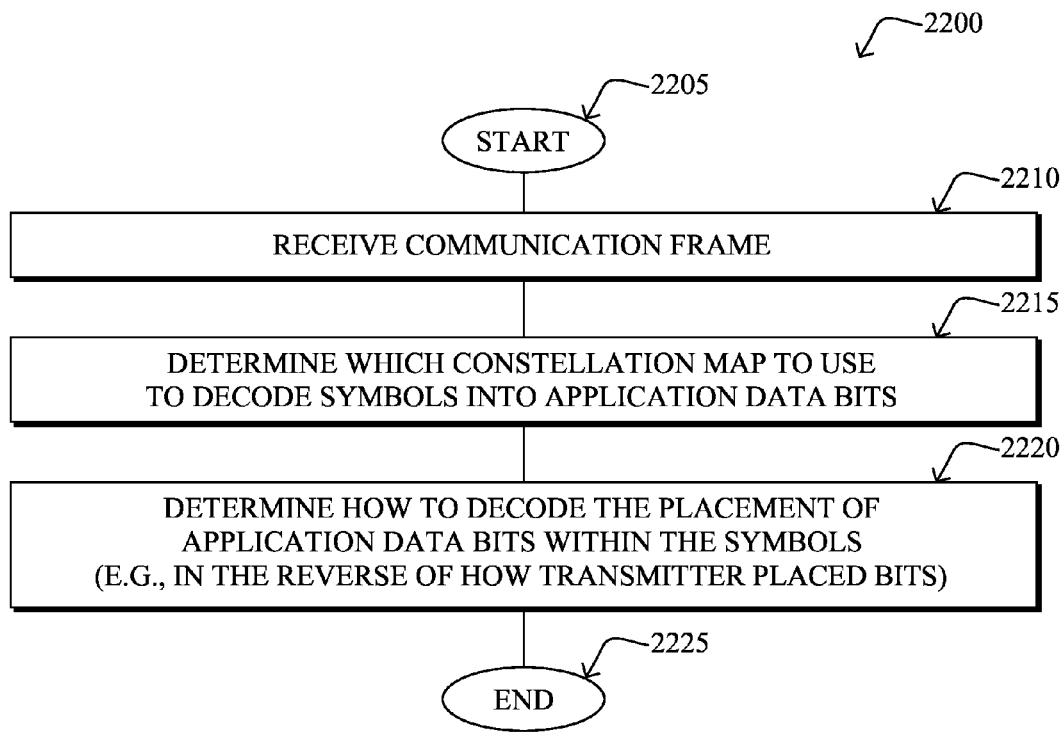
FIG. 22 illustrates another example simplified procedure for bit-based protection for modulation-based communication, particularly from the perspective of a receiving device.

Additionally, FIG. 22 illustrates another example simplified procedure for bit-based protection for modulation-based communication in accordance with one or more embodiments described herein, particularly from the perspective of a receiving device. The procedure 2200 may start at step 2205, and continues to step 2210, where, as described in greater detail above, the receiver receives a communication frame 600. In step 2215 the receiver determines which constellation map 800 to use to decode symbols 620 into application data bits 1150, such as based on pre-configuration, or else based on the constellation map field 616 within the header 610 of the frame. In addition, in step 2220, the receiver also determines how to decode the placement of application data bits within the symbols, such as based on the placement field 618 within the header (partitioning the bits in the reverse of how the transmitter placed bits, as described above). The procedure 2200 may then illustratively end in step 2225, notably repeating itself in response to additionally received frames.

Figure 23:
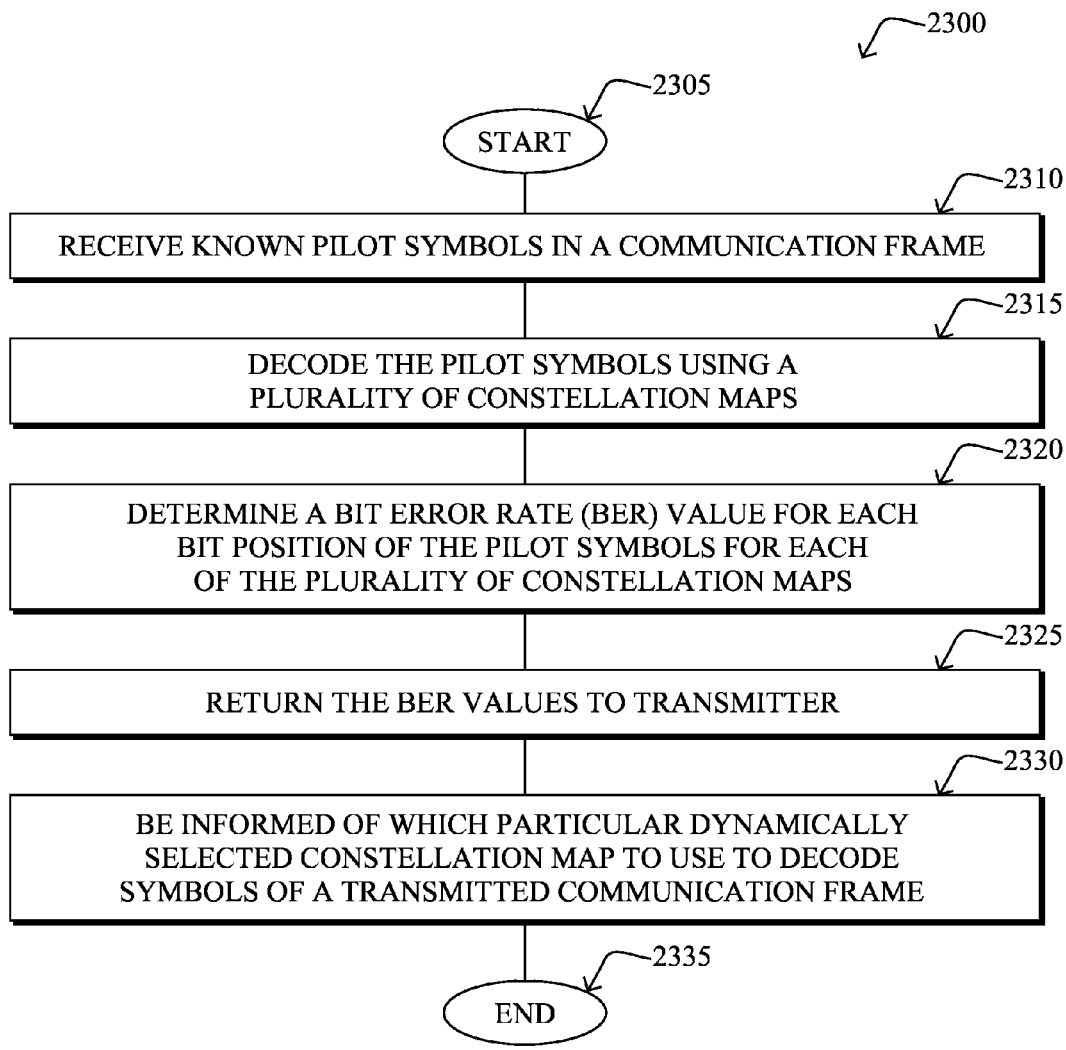
FIG. 23 illustrates another example simplified procedure for bit-based protection for modulation-based communication, particularly for dynamically selected constellation maps from the perspective of a receiving device.

Lastly, FIG. 23 illustrates another example simplified procedure for bit-based protection for modulation-based communication in accordance with one or more embodiments described herein, particularly for dynamically selected constellation maps from the perspective of a receiving device. The procedure 2300 may start at step 2305, and continues to step 2310, where, as described in greater detail above, the receiver receives known pilot symbols 1420 in a communication frame 600, and in step 2315 decodes the pilot symbols using a plurality of constellation maps 800. Based on the fact that the pilot symbols are known, the receiver can, in step 2320, determine a BER value for each bit position of the pilot symbols for each of the plurality of constellation maps, and may then return the BER values to the transmitter in step 2325. Correspondingly, as mentioned above, in step 2330 the receiver may then be informed of which particular dynamically selected constellation map to use to decode symbols of a transmitted communication frame. The procedure 2300 illustratively ends in step 2335, notably with the option of continually receiving pilot symbols within frames to allow for continued dynamic selection of constellation maps, accordingly.

It should be noted that while certain steps within procedures 2000-2300 may be optional as described above, the steps shown in FIGS. 20-23 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 2000-2300 are described separately, certain steps from each procedure may be incorporated into each other procedure, and the procedures are not meant to be mutually exclusive.

The techniques described herein, therefore, provide for bit-based protection for modulation-based communication. In particular, the techniques herein may be used to particularly increase resiliency, reliability, and guarantee to control messages (e.g., for RPL DIO/DAO protection) without adding any form of redundancy into the system. That is, the techniques selectively provide data protection to different priorities of applications through the native features of the modulation-based constellation maps, without imposing any overheads. Moreover, the method is complementary to application-level FEC. Since data protection is native, it does not conflict with higher layer FEC mechanisms. For instance, if a bit is free of error, a correct FEC mechanism on the bit should yield no change.

While there have been shown and described illustrative embodiments that provide for bit-based protection for modulation-based communication, it is to be understood that various other adaptations and modifications may be made within the spirit and scope of the embodiments herein. For example, the embodiments have been shown and described herein with relation to LLNs, such as vehicular networks. However, the embodiments in their broader sense are not as limited, and may, in fact, be used with other types of networks, whether "fast-moving" or not. Also, while certain protocols are shown, such as RPL as an underlying routing topology protocol (for control messages), other suitable protocols may be used, accordingly, such as various Link-State-related routing protocols or reactive protocols or other proactive distance-vector routing protocols where control messages are critical, and RPL is merely an illustrative example.

Further still, while routing-based control messages are shown and described, and in general, the techniques have been described with reference to wireless (or other shared-media) routing topologies, the techniques herein are not limited to routing, and may, in fact, be used with any similar communication, such as video, audio, wired data transmission, storage media transmission, etc., where modulation-based constellation maps may be used, and where certain data may be higher priority than other data.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  transmitting, by a network adaptor, known pilot symbols to one or more receivers to cause the receivers to decode the pilot symbols using a plurality of constellation maps used for modulation-based communication;
  receiving, by the network adaptor, from the one or more receivers a bit error rate (BER) value for each bit position of the pilot symbols for each of the plurality of constellation maps;

determining, by a processor, communication channel conditions based on the BER values;

dynamically selecting, by the processor, a particular constellation map from the plurality of available constellation maps based on the communication channel conditions; and informing, by the processor, the one or more receivers of which particular constellation map to use to decode symbols of a transmitted communication frame.

2. The method as in claim 1, further comprising:

determining a level of error protection of each bit position within symbols of the particular constellation map;

determining priority levels of application data bits to be placed into the communication frame;

placing the application data bits into symbols of the communication frame, wherein higher priority application data bits are placed into bit positions with greater or equal levels of protection than bit positions into which lower priority application data bits are placed; and transmitting the communication frame to one or more receivers with an indication of how to decode the placement of the application data bits within the symbols.

3. The method as in claim 1, wherein the receivers are configured to decode the pilot symbols using the plurality of constellation map.

4. The method as in claim 1, further comprising:

receiving the BER values in an acknowledgment message from the one or more receivers.

5. The method as in claim 1, wherein the particular constellation map is dynamically selected by a network management device, the method comprising:

receiving the particular constellation map from the network management device, wherein the particular constellation map is shared among all devices of a communication network.

6. The method as in claim 1, further comprising:

placing bits in order of priority into bit positions in order of levels of protection.

7. The method as in claim 1, wherein the indication comprises a number of bits in each priority level, wherein the one or more receivers are configured to decode the placement of the application data bits within the symbols by partitioning the placement of application data bits in reverse according to the number of bits in each priority level.

8. The method as in claim 1, wherein control-based application data bits have a higher priority than data-based application data bits.

9. The method as in claim 1, wherein modulation-based communication is selected from a group consisting of: Quadrature Amplitude Modulation (QAM); Phase Shift Keying (PSK); Pulse Position Modulation (PPM); and Frequency Shift Keying (FSK).

10. The method as in claim 1, wherein the constellation map is arranged according to a mapping selected from a group consisting of: Gray code; and block code.

11. An apparatus, comprising:

one or more network interfaces to communicate with receivers in a communication network;

a processor coupled to the network interfaces and adapted to execute one or more processes; and a memory configured to store a process executable by the processor, the process when executed operable to:

transmit known pilot symbols to one or more receivers to cause the receivers to decode the pilot symbols using a plurality of constellation maps used for modulation-based communication;

receive from the one or more receivers a bit error rate (BER) value for each bit position of the pilot symbols for each of the plurality of constellation maps;

determine communication channel conditions based on the BER values;

dynamically select a particular constellation map from the plurality of available constellation maps based on the communication channel conditions; and inform the one or more receivers of which particular constellation map to use to decode symbols of a transmitted communication frame.

12. The apparatus as in claim 11, wherein the process when executed is further operable to:

determine a level of error protection of each bit position within symbols of the particular constellation map;

determine priority levels of application data bits to be placed into the communication frame;

place the application data bits into symbols of the communication frame, wherein higher priority application data bits are placed into bit positions with greater or equal levels of protection than bit positions into which lower priority application data bits are placed; and transmit the communication frame to one or more receivers with an indication of how to decode the placement of the application data bits within the symbols.

13. The apparatus as in claim 11, wherein the receivers are configured to decode the pilot symbols using the plurality of constellation maps.

14. The apparatus as in claim 11, wherein the process when executed is further operable to:

receive the BER values in an acknowledgment message from the one or more receivers.

15. The apparatus as in claim 11, wherein the particular constellation map is dynamically selected by a network management device, the process when executed is further operable to:

receive the particular constellation map from the network management device, wherein the particular constellation map is shared among all devices of a communication network.

16. The apparatus as in claim 11, wherein the process when executed is further operable to:

place bits in order of priority into bit positions in order of levels of protection.

17. The apparatus as in claim 11, wherein the indication comprises a number of bits in each priority level, wherein the one or more receivers are configured to decode the placement of the application data bits within the symbols by partitioning the placement of application data bits in reverse according to the number of bits in each priority level.

18. The apparatus as in claim 11, wherein control-based application data bits have a higher priority than data-based application data bits.

19. The apparatus as in claim 11, wherein modulation-based communication is selected from a group consisting of: Quadrature Amplitude Modulation (QAM); Phase Shift Keying (PSK); Pulse Position Modulation (PPM); and Frequency Shift Keying (FSK).

20. The apparatus as in claim 11, wherein the constellation map is arranged according to a mapping selected from a group consisting of: Gray code; and block code.

21. A tangible, non-transitory, computer-readable media having software encoded thereon, the software when executed by a processor operable to:

transmit known pilot symbols to one or more receivers to cause the receivers to decode the pilot symbols using a plurality of constellation maps used for modulation-based communication;
receive from the one or more receivers a bit error rate (BER) value for each bit position of the pilot symbols for each of the plurality of constellation maps;
determine communication channel conditions based on the BER values;
dynamically select a particular constellation map from the plurality of available constellation maps based on the communication channel conditions; and
inform the one or more receivers of which particular constellation map to use to decode symbols of a transmitted communication frame.

* * * * *